United States Patent
Parthasarathy et al.

(10) Patent No.: US 10,990,467 B2
(45) Date of Patent: Apr. 27, 2021

(54) ACCESSING COMPUTING RESOURCE ATTRIBUTES OF AN EXTERNAL SERVICE PROVIDER

(71) Applicant: Nutanix, Inc., San Jose, CA (US)

(72) Inventors: Ranjan Parthasarathy, Milpitas, CA (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 332 days.

(21) Appl. No.: 15/842,714

(22) Filed: Dec. 14, 2017

(65) Prior Publication Data

US 2019/0334910 A1 Oct. 31, 2019

Related U.S. Application Data

(60) Provisional application No. 62/434,456, filed on Dec. 15, 2016.

(51) Int. Cl.
*H04L 29/06* (2006.01)
*G06F 11/07* (2006.01)
(Continued)

(52) U.S. Cl.
CPC ........ *G06F 11/0793* (2013.01); *G06F 3/0482* (2013.01); *G06F 3/0484* (2013.01);
(Continued)

(58) Field of Classification Search
CPC ............. G06F 9/44505; G06F 9/45512; G06F 9/4843; G06F 9/5027; G06F 9/505;
(Continued)

(56) References Cited

U.S. PATENT DOCUMENTS 7,343,453 B2 3/2008 Prahlad et al.
7,406,053 B2 7/2008 Cheung et al.
(Continued)

OTHER PUBLICATIONS

U.S. Appl. No. 15/818,704, filed Nov. 20, 2017, 71 pages.
(Continued)

*Primary Examiner* — Farid Homayounmehr
*Assistant Examiner* — Sanchit K Sarker
(74) *Attorney, Agent, or Firm* — Foley & Lardner LLP

(57) ABSTRACT

Synchronization techniques for computing systems that interface with external service providers. A method for accessing status and other attributes of an external service provider commences upon identifying an external service such as a firewall appliance or backup repository that provides computing-related functions to computing entities of the computing system. One or more access mechanisms such as an application programming interface is exposed to the external service. The external service is registered with the computing system to use the access mechanism. When the external service detects a change of its state, the external service can communicate that change to the computing system through a "push" operation. The computing system processes the "pushed" data from the external service by verifying the status of the registration and authorization permissions, and then modifies one or more entity attributes of the computing resource entity.

21 Claims, 16 Drawing Sheets

(51) Int. Cl.

| | | |
|---|---|---|
| G06F 9/50 | (2006.01) | |
| G06F 16/242 | (2019.01) | |
| H04L 12/24 | (2006.01) | |
| G06F 16/27 | (2019.01) | |
| G06F 16/951 | (2019.01) | |
| G06F 3/0482 | (2013.01) | |
| G06F 3/0484 | (2013.01) | |
| G06F 8/71 | (2018.01) | |
| G06F 9/445 | (2018.01) | |
| G06F 9/455 | (2018.01) | |
| G06F 9/48 | (2006.01) | |
| G06F 9/54 | (2006.01) | |
| G06F 11/14 | (2006.01) | |
| H04L 29/08 | (2006.01) | |

(52) U.S. Cl.
CPC .......... *G06F 8/71* (2013.01); *G06F 9/44505* (2013.01); *G06F 9/45512* (2013.01); *G06F 9/4843* (2013.01); *G06F 9/5027* (2013.01); *G06F 9/547* (2013.01); *G06F 11/0721* (2013.01); *G06F 11/0751* (2013.01); *G06F 11/1451* (2013.01); *G06F 16/242* (2019.01); *G06F 16/27* (2019.01); *G06F 16/951* (2019.01); *H04L 41/0896* (2013.01); *H04L 41/28* (2013.01); *H04L 41/5009* (2013.01); *H04L 63/102* (2013.01); *H04L 63/20* (2013.01); *H04L 67/34* (2013.01); *G06F 9/45558* (2013.01); *G06F 9/5005* (2013.01); *G06F 9/505* (2013.01); *G06F 9/5011* (2013.01); *G06F 2201/84* (2013.01); *H04L 67/10* (2013.01)

(58) Field of Classification Search
CPC ............ G06F 11/0721; G06F 11/0751; G06F 11/0793; G06F 11/1451; G06F 16/27; G06F 16/951; G06F 9/547; G06F 3/0482; G06F 3/0484; G06F 8/71; G06F 2201/84; G06F 9/5005; G06F 9/45558; H04L 41/28; H04L 63/102; H04L 63/20; H04L 67/34; H04L 67/10
USPC .......................................................... 726/4
See application file for complete search history.

(56) References Cited

U.S. PATENT DOCUMENTS

| | | | |
|---|---|---|---|
| 7,433,951 B1 | 10/2008 | Waldspurger | |
| 7,725,671 B2 | 5/2010 | Prahlad et al. | |
| 7,783,666 B1* | 8/2010 | Zhuge | G06F 16/122 707/783 |
| 7,840,533 B2 | 11/2010 | Prahlad et al. | |
| 7,861,247 B1 | 12/2010 | Santos et al. | |
| 7,941,605 B1* | 5/2011 | Oren | G06F 16/90339 711/128 |
| 8,112,489 B1 | 2/2012 | Cox et al. | |
| 8,209,687 B2 | 6/2012 | Yuyitung et al. | |
| 8,234,650 B1 | 7/2012 | Eppstein et al. | |
| 8,260,897 B2 | 9/2012 | Graser et al. | |
| 8,296,419 B1 | 10/2012 | Khanna et al. | |
| 8,443,370 B2 | 5/2013 | Smith et al. | |
| 8,447,728 B2 | 5/2013 | Prahlad et al. | |
| 8,549,518 B1 | 10/2013 | Aron et al. | |
| 8,600,947 B1 | 12/2013 | Freiheit et al. | |
| 8,601,473 B1 | 12/2013 | Aron et al. | |
| 8,762,335 B2 | 6/2014 | Prahlad et al. | |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,397,886 B2 | 7/2016 | Yasuda et al. | |
| 9,473,799 B1 | 10/2016 | Mentz et al. | |
| 9,495,142 B2 | 11/2016 | Koushik et al. | |
| 9,542,225 B2 | 1/2017 | Yamashima et al. | |
| 9,558,459 B2 | 1/2017 | Bobak et al. | |
| 9,575,784 B1 | 2/2017 | Aron et al. | |
| 9,612,815 B1 | 4/2017 | Jagtap et al. | |
| 9,619,257 B1 | 4/2017 | Aron et al. | |
| 9,654,511 B1 | 5/2017 | Brocco et al. | |
| 9,740,723 B2 | 8/2017 | Prahlad et al. | |
| 9,754,303 B1 | 9/2017 | Jagtap et al. | |
| 9,772,866 B1 | 9/2017 | Aron et al. | |
| 10,026,070 B2 | 7/2018 | Thorpe et al. | |
| 10,104,170 B2 | 10/2018 | Sebbah et al. | |
| 10,210,048 B2 | 2/2019 | Sancheti | |
| 10,248,657 B2 | 4/2019 | Prahlad et al. | |
| 10,346,775 B1 | 7/2019 | Xu et al. | |
| 10,430,293 B1 | 10/2019 | Skowronski et al. | |
| 2004/0103173 A1 | 5/2004 | Donatelli et al. | |
| 2004/0122830 A1 | 6/2004 | Schwartz et al. | |
| 2005/0228826 A1 | 10/2005 | Beran et al. | |
| 2006/0225065 A1 | 10/2006 | Chandhok et al. | |
| 2007/0055924 A1 | 3/2007 | Farr et al. | |
| 2007/0220039 A1 | 9/2007 | Waldman et al. | |
| 2008/0134178 A1 | 6/2008 | Fitzgerald et al. | |
| 2008/0134193 A1 | 6/2008 | Corley et al. | |
| 2009/0182915 A1 | 7/2009 | Farrell et al. | |
| 2009/0183168 A1 | 7/2009 | Uchida | |
| 2010/0031155 A1 | 2/2010 | Stephen | |
| 2010/0145929 A1 | 6/2010 | Burger et al. | |
| 2011/0096687 A1 | 4/2011 | Döttling et al. | |
| 2011/0276951 A1 | 11/2011 | Jain | |
| 2012/0166977 A1 | 6/2012 | Demant et al. | |
| 2012/0203911 A1 | 8/2012 | London et al. | |
| 2012/0254719 A1 | 10/2012 | Hackmann et al. | |
| 2012/0291042 A1 | 11/2012 | Stubbs et al. | |
| 2013/0007753 A1 | 1/2013 | Jain | |
| 2013/0103835 A1 | 4/2013 | Yotsutani et al. | |
| 2014/0046638 A1 | 2/2014 | Peloski | |
| 2014/0108034 A1 | 4/2014 | Akbay et al. | |
| 2014/0244842 A1 | 8/2014 | Rosensweig et al. | |
| 2014/0282518 A1 | 9/2014 | Banerjee | |
| 2014/0282586 A1 | 9/2014 | Shear et al. | |
| 2015/0058902 A1 | 2/2015 | Rea et al. | |
| 2015/0121520 A1 | 4/2015 | Tsien et al. | |
| 2015/0134717 A1* | 5/2015 | Naganuma | G06F 11/1464 709/201 |
| 2015/0135185 A1 | 5/2015 | Sirota et al. | |
| 2015/0220553 A1 | 8/2015 | Poon et al. | |
| 2015/0356078 A1* | 12/2015 | Kishimoto | G06F 16/178 707/610 |
| 2016/0055026 A1 | 2/2016 | Fitzgerald et al. | |
| 2016/0179416 A1 | 6/2016 | Mutha et al. | |
| 2016/0188594 A1 | 6/2016 | Ranganathan | |
| 2017/0155560 A1 | 6/2017 | Lee et al. | |
| 2017/0168907 A1 | 6/2017 | Harper et al. | |
| 2018/0007060 A1* | 1/2018 | Leblang | H04W 12/06 |
| 2018/0018082 A1 | 1/2018 | Sarbin et al. | |
| 2018/0063017 A1 | 3/2018 | Beveridge | |

OTHER PUBLICATIONS

"What are protocol buffers?". Google Developers. Sep. 5, 2017. 2 pages.
Wikipedia. "Anonymous function". Sep. 16, 2017. 38 pages.
Non-Final Office Action dated Apr. 30, 2019 for U.S. Appl. No. 15/842,698, 15 pages.
Cano, Ignacio, et al. "Curator: Self-Managing Storage for Enterprise Clusters" (Mar. 27, 2017), from https://www.usenix.org/conference/nsdi17/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Apr. 26, 2019 for U.S. Appl. No. 15/842,869, 17 pages.

\* cited by examiner

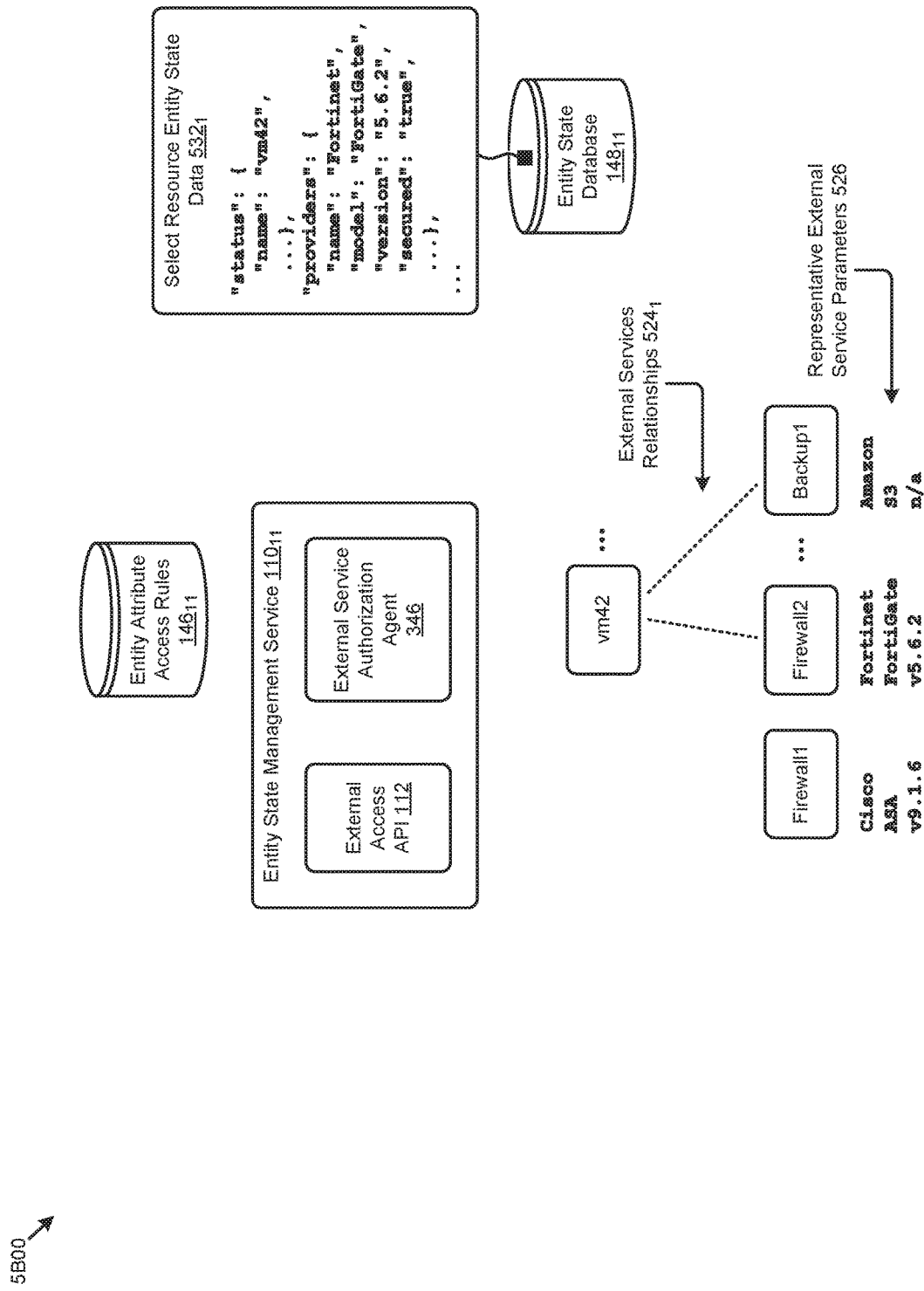
FIG. 5B1

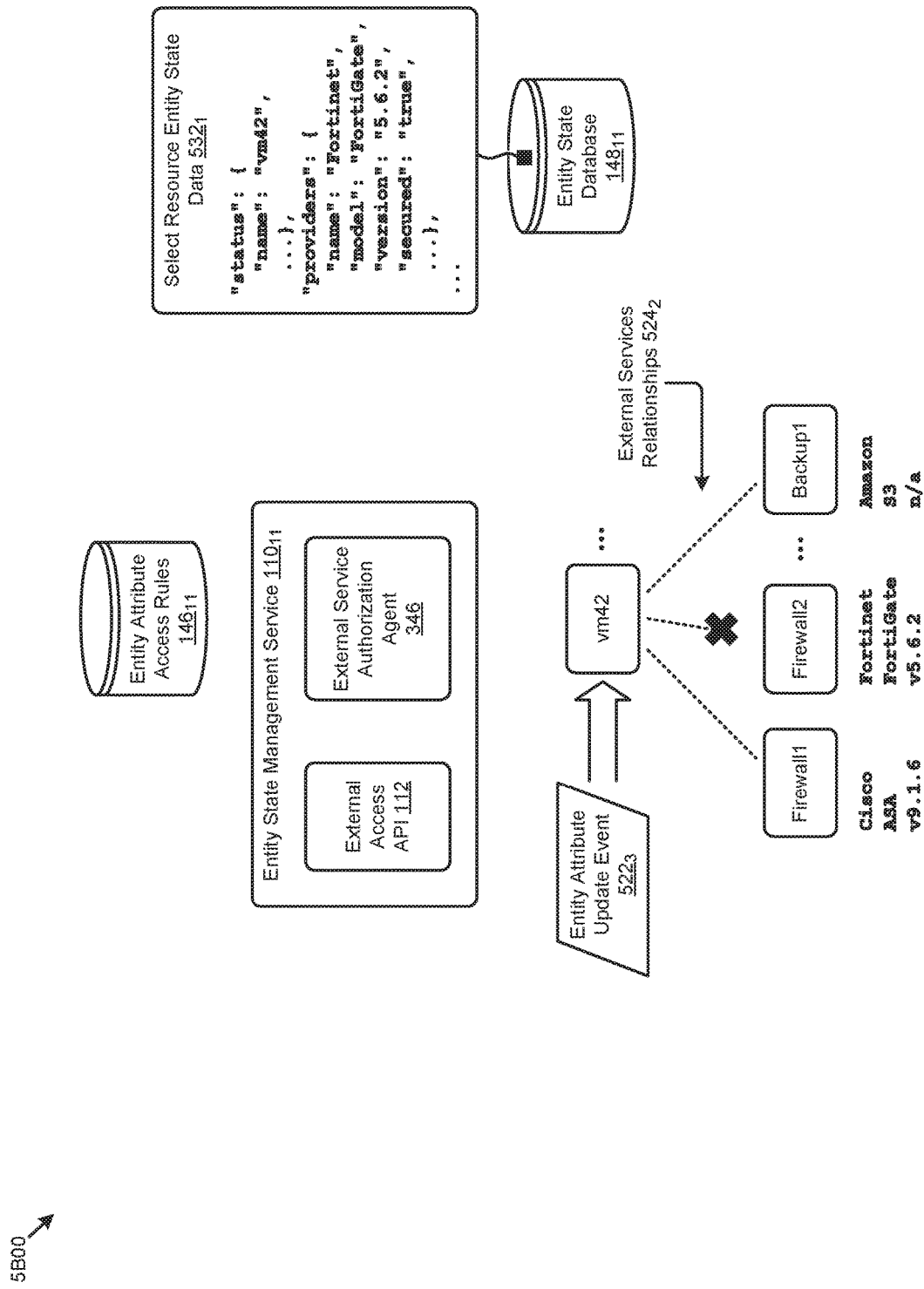
FIG. 5B2

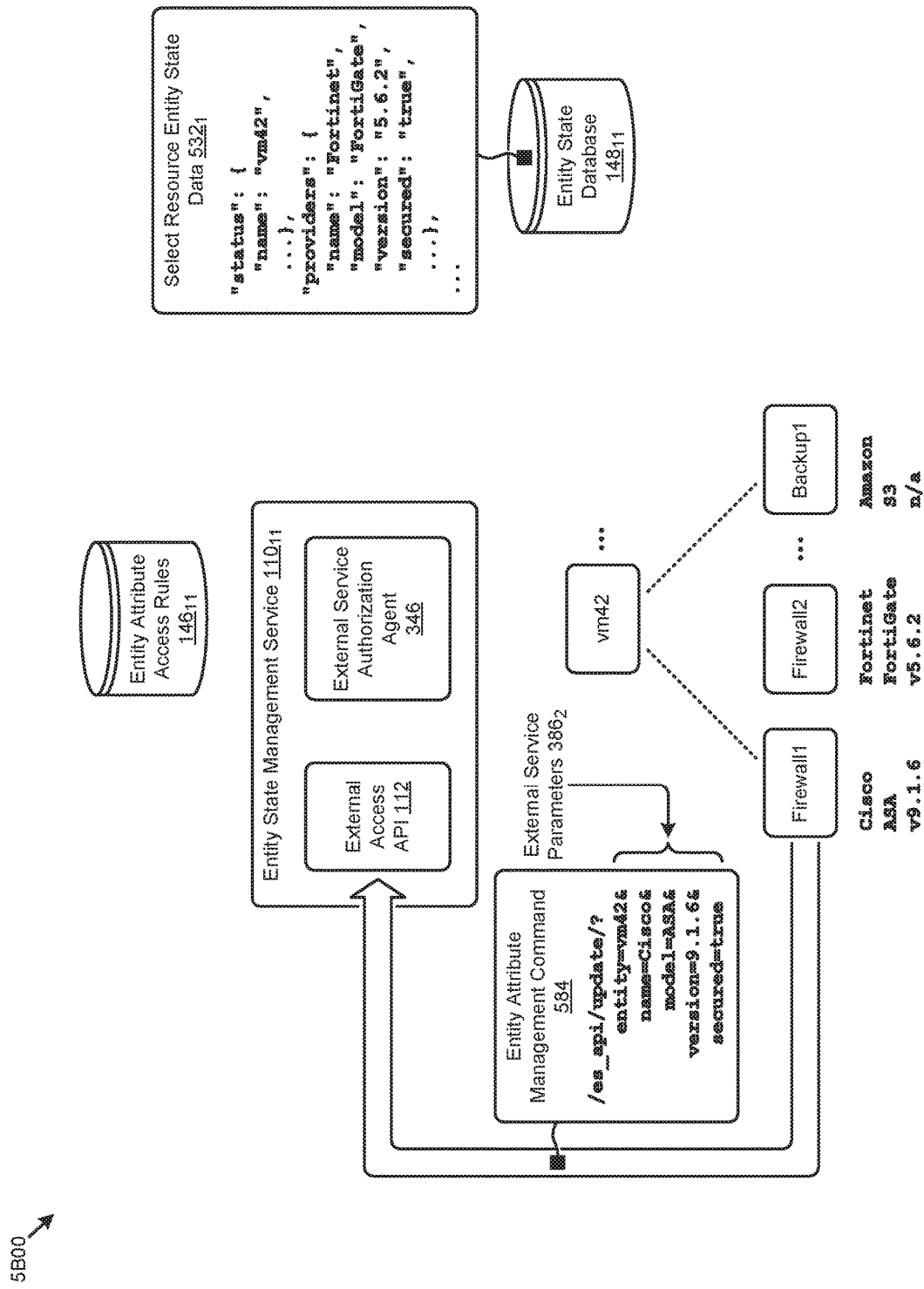
FIG. 5B3

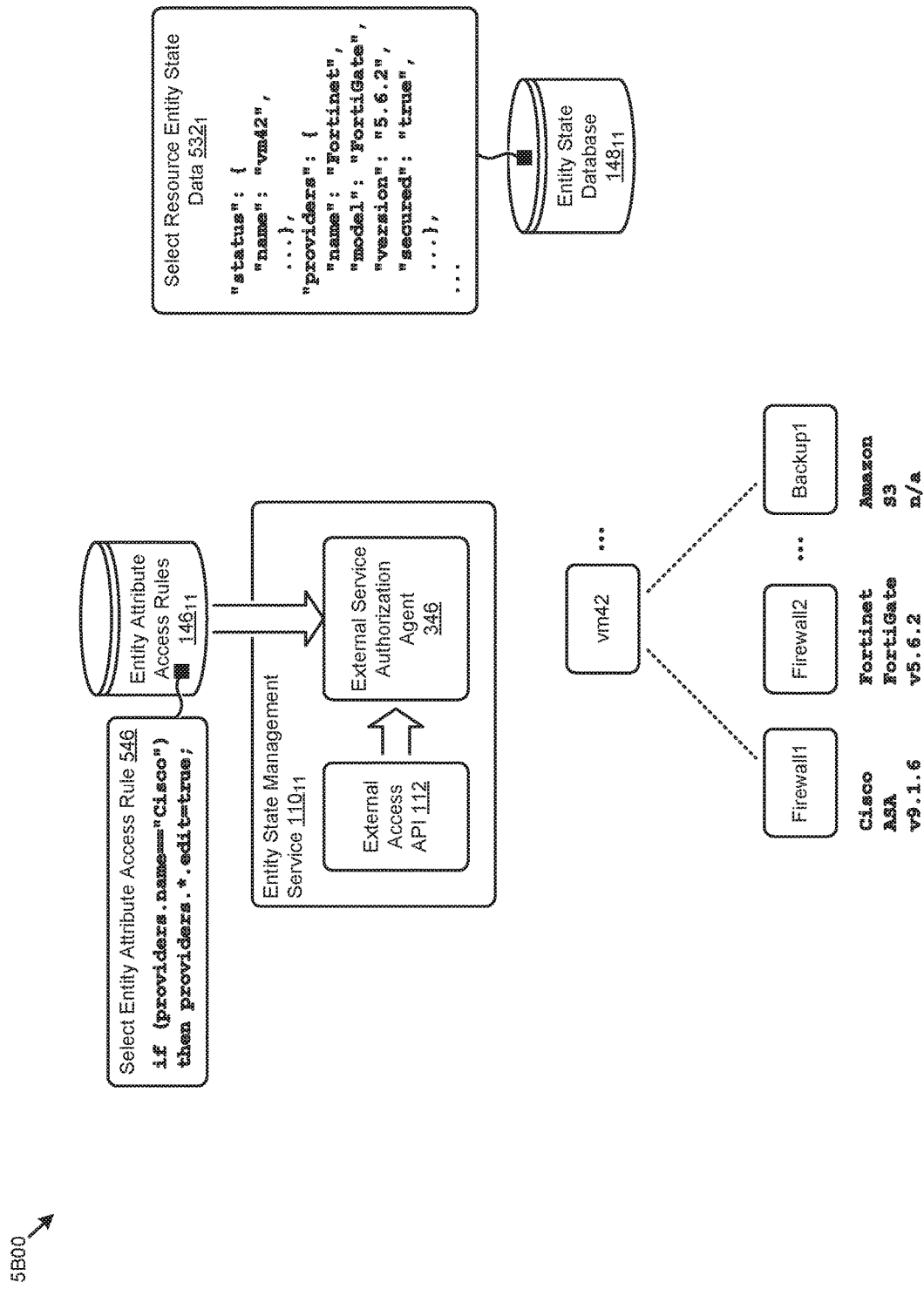
FIG. 5B4

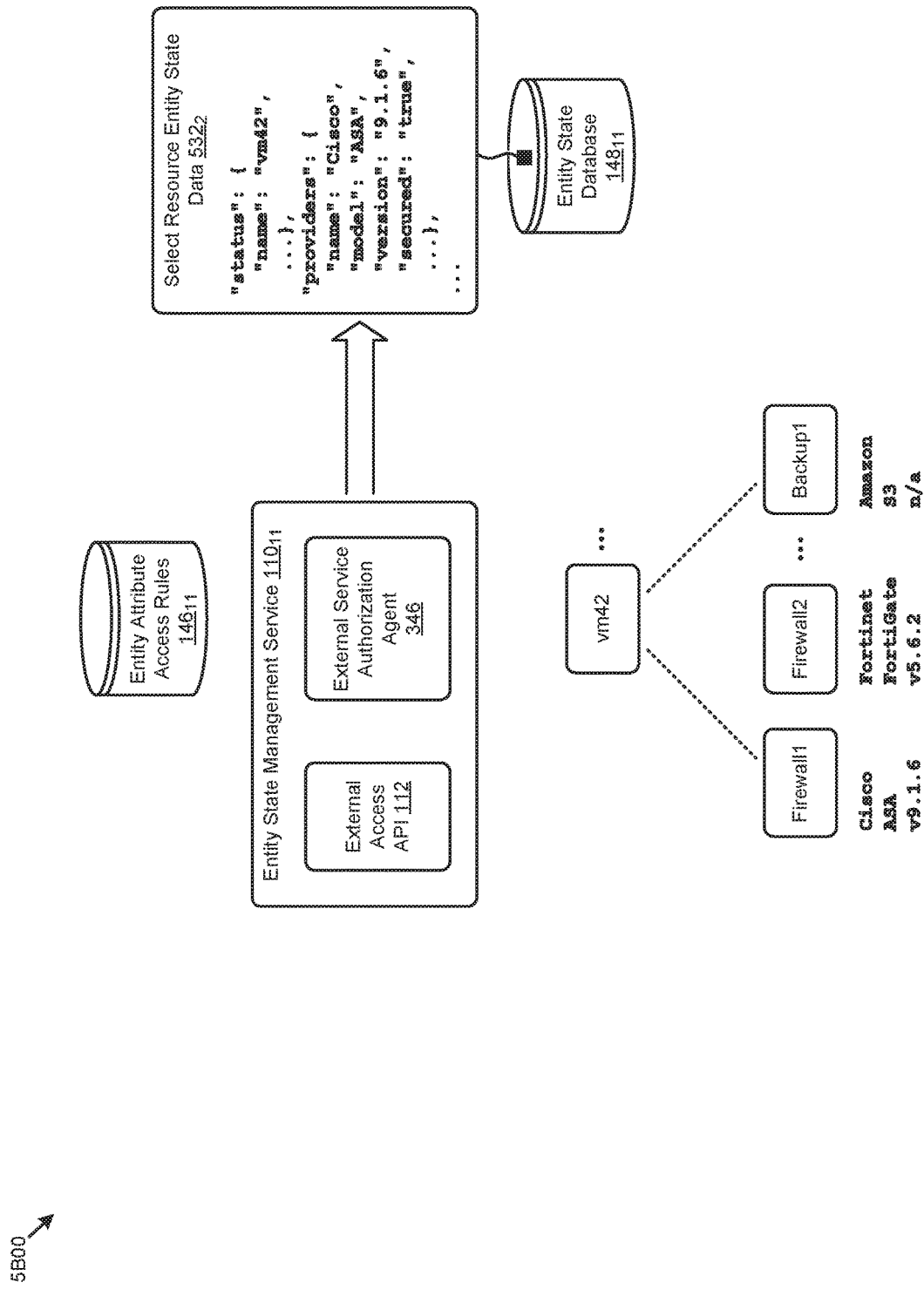
FIG. 5B2

ACCESSING COMPUTING RESOURCE ATTRIBUTES OF AN EXTERNAL SERVICE PROVIDER

RELATED APPLICATIONS

The present application claims the benefit of priority to U.S. Patent Application Ser. No. 62/434,456 titled "INTENT FRAMEWORK", filed on Dec. 15, 2016, which is hereby incorporated by reference in its entirety; and the present application is related to U.S. patent application Ser. No. 15/842,698 titled "RESOURCE STATE ENFORCEMENT", now U.S. Pat. No. 10,733,041, filed on even date herewith, which is hereby incorporated by reference in its entirety; and the present application is related to U.S. patent application Ser. No. 15/842,436 titled "SPECIFICATION-BASED COMPUTING SYSTEM CONFIGURATION" now U.S. Pat. No. 10,558,478, filed on even date herewith, which is hereby incorporated by reference in its entirety; and the present application is related to U.S. patent application Ser. No. 15/842,869 titled "USER INTERFACE VIEW GENERATION", filed on even date herewith, now abandoned, which is hereby incorporated by reference in its entirety; and the present application is related to U.S. patent application Ser. No. 15/842,837 titled "RULE-BASED DATA PROTECTION", now U.S. Pat. No. 10,802,835, filed on even date herewith, which is hereby incorporated by reference in its entirety.

FIELD

This disclosure relates to distributed computing, and more particularly to techniques for accessing computing resource attributes of an external service provider.

BACKGROUND

The computing resources in modern virtualized computing systems can have many operational attributes. For example, a virtual machine (VM) in a computing system might be characterized by a CPU number, a hypervisor type, a memory size, and/or other attributes. Various instances of other computing resources in the computing system, such as virtual disks (vDisks), virtual network interface cards (vNICs), executable containers (ECs), availability zones (AZs), and/or other resource entities, also have a respective set of operational attributes. The operational attributes for each computing resource entity are often established to facilitate performance of a certain set of then-current and/or anticipated tasks. In many computing systems, these tasks and the associated collection of facilitating resource entities and/or entity-specific configurations (e.g., sets of operational attributes) change frequently over time. User interfaces are often provided to facilitate management (e.g., viewing, modifying, etc.) of the attributes of the computing resources. In some cases, the computing resources of a particular computing system interact with external resources to carry out their respective tasks. For example, a VM in a computing cluster might be protected by a firewall service that is external to the cluster. As the VM is cloned and/or migrated to other nodes in the cluster and/or to other clusters, the particular firewall service (e.g., vendor, model, version, etc.) that is performing services for the respective instances of the VM can vary. For any such occurrence, a user might desire to confirm the existence and details (e.g., external attributes) of the firewall service.

Unfortunately, determining and accessing the attributes of external resources can present challenges. Specifically, and as earlier mentioned, certain entity attributes of the external resources might be accessible only through a vendor-supplied interface. Since access to the external resources is often restricted (e.g., for security reasons), certain attributes of the external resources may not be easily accessible. One approach to addressing this challenge is to analyze each of the external service interfaces from each of the external service providers to discover the services that are associated with computing resources that use the external service, then determine applicable attributes, then write the needed code to access the attributes while observing the vendor's security/access requirements. Such an approach, however, does not efficiently scale given the hundreds or more external services that are associated with the hundreds or more resource entities that are used in today's dynamically changing computing systems. The human effort and computing resources needed to develop and maintain a codebase to accommodate the various taxonomies, APIs, and/or other possible access mechanisms to communicate with the external services has become too onerous.

What is needed is a technological solution to interface with these external services without having to develop and maintain an ever-expanding codebase for the multitudes of service providers.

SUMMARY

The present disclosure describes techniques used in systems, methods, and in computer program products for synchronizing computing resource attributes between external service provider equipment and internal virtualization data structures, which techniques advance the relevant technologies to address technological issues with legacy approaches. More specifically, the present disclosure describes techniques used in systems, methods, and in computer program products for providing computing resource attribute access mechanisms that are exposed to external service providers. Certain embodiments are directed to technological solutions for exposing a set of application programming interfaces to a set of external services so as to authorize management of certain resource entity attributes by the external services.

The disclosed embodiments modify and improve over legacy approaches. In particular, the herein-disclosed techniques provide technical solutions that address the technical problems attendant to efficiently accessing the external attributes of external services associated with internal computing resources. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing system management as well as advances in various technical fields related to computing platform scalability.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIGS. 5B1, 5B2, 5B3, 5B4, and 5B5 illustrate an external entity attribute management scenario as implemented in systems that facilitate management of internal computing resource attributes by external service providers, according to an embodiment.

DETAILED DESCRIPTION

Figure 1:
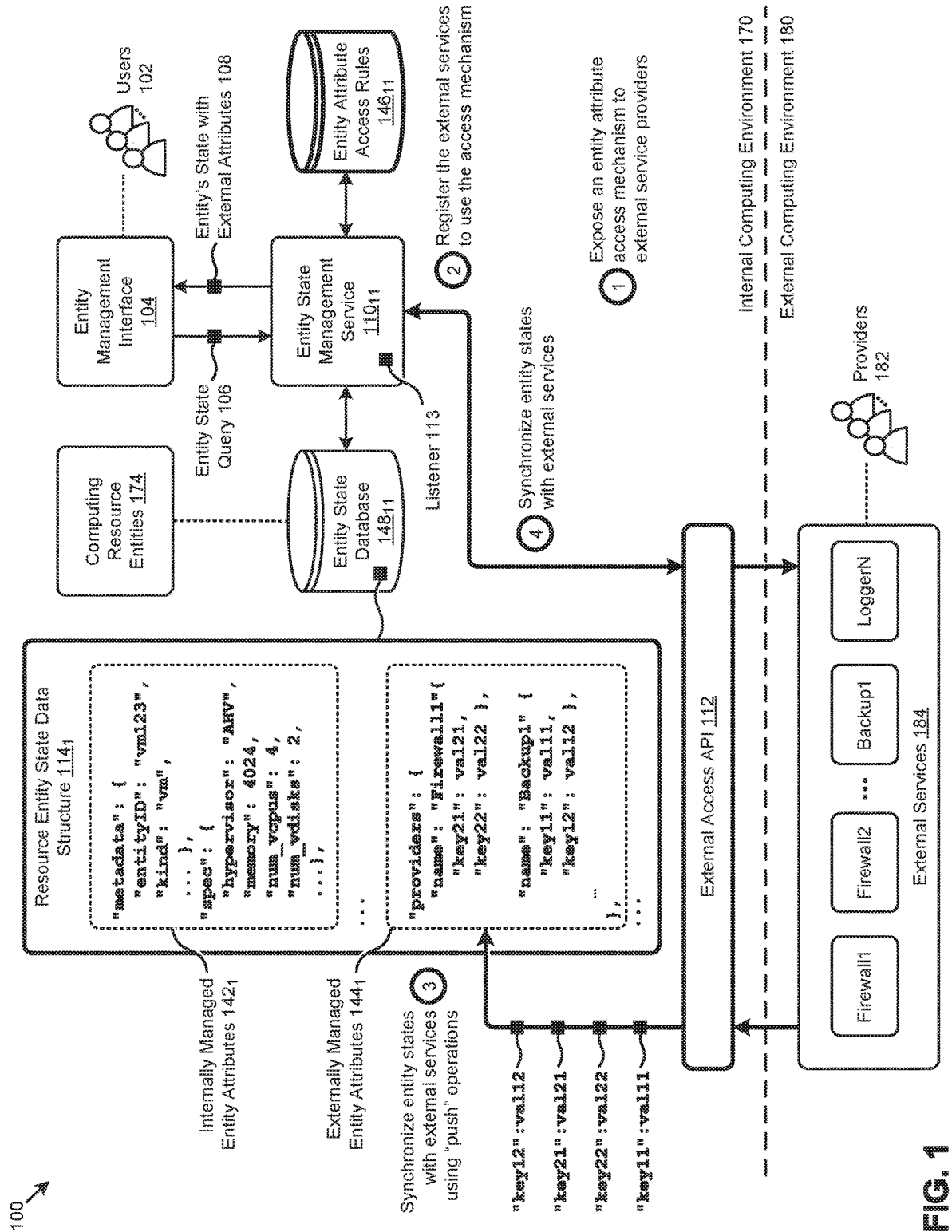
FIG. 1 illustrates a computing environment in which embodiments of the present disclosure can be implemented.

Embodiments in accordance with the present disclosure address the problem of efficiently accessing the external attributes of external services, which external attributes are used by internal computing resources. Some embodiments are directed to approaches for implementing access mechanisms that authorize the external services to "push" values to internally-stored resource entity attributes. Some embodiments are directed to approaches for implementing access mechanisms that install an executable agent onto the external services. Such an agent facilitates both "pull" and "push" operational modes so as to make data and/or parameters of the external services available to resource entities of the internal computing system. The accompanying figures and discussions herein present example environments, systems, methods, and computer program products for management of computing resource attributes by external service providers.

Overview

Disclosed herein are techniques for providing an access mechanism to a set of external services to facilitate management of computing resource entity attributes by the external services. In certain embodiments, a registration facility, a set of entity attribute access rules, a messaging protocol, a listener, and an external access application programming interface (API) comprise the access mechanism. In one embodiment, a capability to communicate with/through the external access API is implemented in the external services by their respective service providers. The developers of the external services can choose to use all or portions of the access mechanism to issue or invoke entity attribute management operations or requests pertaining to the resource entities. During ongoing operation, a set of entity attribute access rules are consulted to receive authorization to use particular operational modes. If authorized, various entity attribute management operations are executed to, for example, synchronize the then-current states of the resource entities with their respective then-current values from the external service. In certain embodiments, issuance of the entity attribute management operations by the external services are invoked by the resource entities. In certain embodiments, the entity attribute management operations are responsive to a change event detected by the external services. In certain embodiments, the external services are registered so as to receive authorization to use some or all of the operational modes of the access mechanism.

Strictly as one example scenario, a firewall service provider might update its firewall appliance firmware, and the firmware might have a new version number. The firewall service can call the API to issue an entity attribute management operation request or other form of an entity attribute management operation indication (e.g., an API request to "push" a data item) so as to update the version number in the entity attributes of the resource entities that are connected to the firewall service. As such, when any of the resource entities, or any user managing the resource entities, queries the entity attributes for the firmware version number of the firewall service, the then-current version number will be returned. As such there is no burden on a developer and/or administrator to access the then-current version number, since the information was "pushed" to the storage location of the corresponding entity attribute.

As another example scenario, a firewall service may have several states of operation, such as "security_level_1", "security_level_2", or "unsecured". A computing resource entity (e.g., VM) using the firewall service might perform processing differently based on a then-current state of operation of the firewall service. The resource entity could poll the firewall service to issue an entity attribute management operation (e.g., an operation originated by a "pull" from the resource entity) that updates the entity attributes of the resource entity to reflect the then-current operational states of the external service. Alternatively, upon the event of the firewall service moving from one operational state to another operational state, the firewall service could originate an operation such as to call the API to "push" the then-current operational state of the external service into the entity attributes of the resource entity.

In embodiments described herein, an entity attribute management operation indication is any data item or other codification that is formed by an external service. An entity attribute management operation is any operation that is initially indicated by an external service. The entity attribute management operation might be partially implemented by the external service and partially implemented by an agent other than the external service. The foregoing and other scenarios, illustrate how the herein disclosed techniques facilitate improvements in computer functionality that reduce the demand for computer memory, reduce the demand for computer processing power, reduce network bandwidth use, and reduce the demand for inter-component communication. Specifically, rather than developing and maintaining a large codebase of taxonomies, APIs, and logic to accommodate the many-to-many associations between resource entities and external services, a significantly smaller codebase is implemented to provide a single access mechanism (e.g., an API and a rule base) that facilitates management of certain resource entity attributes by the plurality of external services. This approach serves to eliminate the storage resources required to store the large codebase and/or the computing resources consumed to develop and/or maintain the large codebase.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented.

As an option, one or more variations of computing environment 100 or any aspect thereof may be implemented in the context of the architecture and functionality of the embodiments described herein.

In computing environments such as computing environment 100, a user (e.g., from users 102) might desire to access information about external services (e.g., external services 184) from an external computing environment 180 that are associated with resource entities (e.g., computing resource entities 174) from an internal computing environment 170. Unfortunately, determining such external service information (e.g., attributes) presents challenges. Specifically, while some entity attributes of the computing resource entities 174 might be accessible by users 102 at an entity management interface 104, access to the external attributes of the external services for presentation in the interface is often restricted (e.g., for security reasons).

One approach to address this challenge is to check each of the external services 184 (e.g., "Firewall1", "Firewall2", . . . , "Backup1", "LoggerN", etc.) from each of the various external service providers (e.g., providers 182) to discover the associations between the external services and the computing resources and to determine the attributes of those external services. Such an approach, however, does not efficiently scale given the hundreds or more external services 184 that are dynamically associated with the hundreds or more computing resource entities 174 in today's computing systems (e.g., computing environment 100). The human effort and computing resources needed to develop and maintain a codebase to accommodate the various taxonomies, APIs, and/or possible associations of the external services further limit the scalability of such approaches.

The herein disclosed techniques address the foregoing problems attendant to efficiently accessing the external attributes of the external services 184 associated with the computing resource entities 174 by providing an entity attribute access mechanism to the external services to facilitate management of certain resource entity attributes by the external services (operation 1).

In the shown embodiment of FIG. 1, an external access API 112, a set of entity attribute access rules $146_{11}$, and a resource entity state data structure $114_1$ comprise the access mechanism. As used herein, an access mechanism refers to any machine-to-machine interfacing technique that supports communication of a data value from one machine to another machine. One example of an access mechanism is an application programming interface (API). Another example is a data structure that is accessible by at least both of the machines that use the machine-to-machine interface. Yet another example of an access mechanism is messaging between at least both of the machines that use a machine-to-machine interface. Still other embodiments of access mechanisms include registration, callbacks, and listening such that multiple modes of operation are supported. Any of the foregoing example access mechanisms can be combined in any manner that results in an operable machine-to-machine interface. Each of the machines that use the machine-to-machine interface can implemented a specific portion of the technique.

In the embodiment of FIG. 1, an access API is provided, and the specific portion of the technique to communicate data values using the external access API 112 is implemented in the external services 184 by their respective service providers (e.g., providers 182). When communication with the external services 184 is established, then any one or more of the external services are registered and authorized to use the access mechanism (operation 2). For example, the external services 184 might register with an entity state management service 110$_{11}$ that is associated with the computing resource entities 174 in the internal computing environment 170. The registration process might invoke a listener 113 and/or create access credentials (e.g., an access token, password, etc.) that are used to authenticate and/or authorize certain interactions with the access mechanism (e.g., external access API 112, entity attribute access rules 146$_{11}$, resource entity state data structure 114$_1$, etc.) by the external services 184.

The registered external services use the external access API 112 to issue entity attribute management operations pertaining to one or more of the computing resource entities 174. In some cases, the external services 184 might issue "push" operations to synchronize the then-current state of the computing resource entities 174 with their respective then-current associations with the external services (operation 3). Specifically, and as shown in FIG. 1, one or more key-value pairs (e.g., "key12":val12", "key21": val21", "key22": val22", and "key11": val11") might be issued by the external services 184 using the access mechanism to populate a set of externally managed entity attributes 144$_1$ comprising the resource entity state data structure 114$_1$. While the external services 184 might have authorized access to the externally managed entity attributes 144$_1$ in accordance with the access mechanism, the access mechanism also prohibits access by the external services 184 to unauthorized portions of the internally managed entity attributes 142$_1$ and resource entity state data structures. Such internally managed entity attributes 142$_1$ are managed, for example, by the entity state management service 110$_{11}$. In some cases, the then-current resource entity states might be synchronized (operation 4) with the then-current external service associations. In some cases, a "pull" operation is initiated by the entity state management service 110$_{11}$ to call the external access API 112.

The techniques disclosed herein facilitate access to information pertaining to the then-current external services associated with a particular resource entity without the significant human effort and resource consumption of other approaches. Specifically, as facilitated by the herein disclosed techniques, a user can issue an entity state query 106 to the entity state management service 110$_{11}$ from an instance of entity management interface 104, and receive information describing an entity's state with external attributes 108 (e.g., internally managed entity attributes 142$_1$ and externally managed entity attributes 144$_1$). In this case, the externally managed entity attributes 144$_1$ can be continually and/or autonomously updated by the external services 184 and stored in instances of a resource entity state data structure in an entity state database 148$_{11}$ for asynchronous access by users 102.

One embodiment of a technique for management of entity attributes by an external resource is disclosed in further detail as follows.

Figure 2:
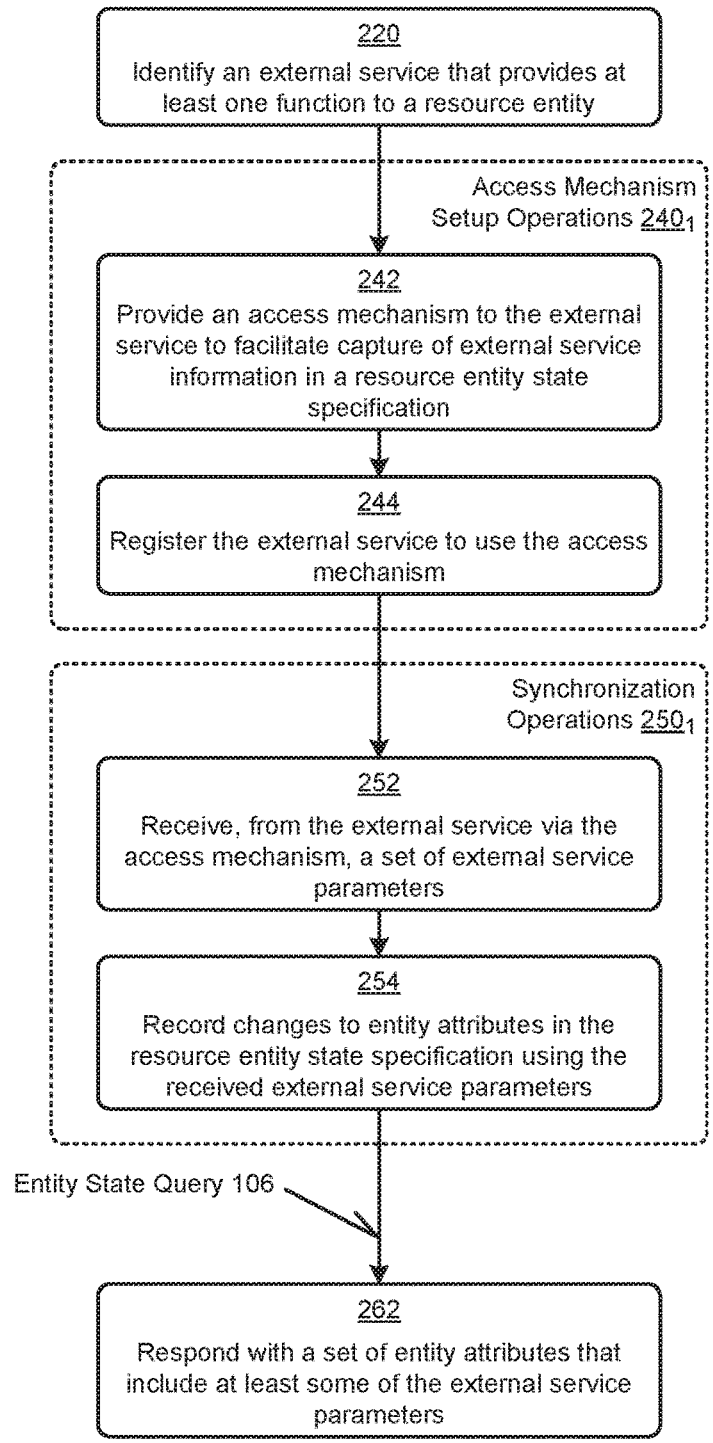
FIG. 2 depicts an external entity attribute management technique as implemented in systems that facilitate management of computing resource attributes by external service providers, according to an embodiment.

FIG. 2 depicts an external entity attribute management technique 200 as implemented in systems that facilitate management of computing resource attributes by external service providers. As an option, one or more variations of external entity attribute management technique 200 or any aspect thereof may be implemented in the context of the architecture and functionality of the embodiments described herein. The external entity attribute management technique 200 or any aspect thereof may be implemented in any environment.

The external entity attribute management technique 200 presents one embodiment of certain steps and/or operations that facilitate management of computing resource attributes by external service providers. As shown, certain portions of the steps and/or operations can be grouped in a set of access mechanism setup operations 240$_1$ and a set of synchronization operations 250$_1$. As illustrated, external entity attribute management technique 200 can commence by identifying at least one external service that provides a function (e.g., firewall protection, data backup, etc.) to a resource entity (step 220). The external service can be provided as a "box" that comprises both hardware or software as provided by an external service provider. In some cases, the external service is provided as a web service (e.g., in a software implementation) as provided by an external service provider and hosted on any computing hardware.

The access mechanism setup operations 240$_1$ include providing an access mechanism to the external service to facilitate capture of external service information in a resource entity state specification (step 242). Strictly as one example, an access mechanism might be provided in the form of an application programming interface or as an endpoint or route to a web service. The external service is then registered (e.g., with an agent associated with the resource entity) to use the access mechanism (step 244).

The synchronization operations 250$_1$ can commence by receiving, from the external service at the access mechanism, certain entity attribute management operations that comprise various external service parameters (step 252). For example, an entity attribute management operation might call for an update of an entity attribute that pertains to the firmware version of an external service. Select entity attributes in the resource entity state specification are synchronized with the external service parameters associated with the entity attribute management operations (step 254).

Upon a request for a resource entity state (e.g., entity state query 106), a set of entity attributes for the resource entity that include at least some of the synchronized external service parameters is provided in a response (step 262). Such an entity state query can come in any form, including but not limited to, an API call, a callback, an http call to an endpoint or route, a database query, etc.

In another scenario, a plurality of heterogeneous external services are supported such that two or more heterogeneous external services can operate concurrently. For example, a first external service might provide firewall services and a second external service might provide backup services. Each of the external services registers with an access mechanism such that each service becomes authorized for READ/WRITE access to a certain set of resource entity attributes. The aforementioned certain set of resource entity attributes can be codified in a lookup data structure such as is given by Table 1.

TABLE 1

Example of a lookup data structure

| External Service ID | Access Type | Authorized Parameter Scope | Mode(s) |
|---|---|---|---|
| 1 | Provider-defined API | Any resource entity attribute | Pull from the external service |
| 2 | Agent within the external service | Only resource entity attributes within the "provider" scope | Push from the external service |
| 3 | Open source API | Any resource entity attribute | Pull or push |

In some cases (e.g., as depicted in Table 1 and pertaining to the external service with ID=1), an external service operates in a "pull mode" exclusively (e.g., performs "pull" operations exclusively). In other cases (e.g., as depicted in Table 1 and pertaining to the external service with ID=2), an external service operates in a "push mode" exclusively (e.g., performs "push" operations exclusively). In still other cases, a single external service can function in a mode that support both "push" operations as well as "pull" operations.

As used herein, a "push" is an operation practiced by an external service when the external service initiates communication of external service data or parameters without being responsive to an action/request from the internal computing system. In contrast, a "pull" operation is practiced when a computing process other than an external service initiates communication with the external service so as to access data or parameters from the external service. In some cases, both "push" operations as well as "pull" operations can be performed concurrently and/or interleaved.

In example implementations, a "push" of a value from an external service to a recipient occurs as a result of execution of program instructions that are initiated at or by the external service as a result of a changing data of the external service, or as a result of a timer timeout, or as a result of logic at or by the external service, without being responsive to any particular action/request by/from the internal computing system.

In the embodiment of FIG. 1, when a process of the internal computing environment 170 needs to retrieve attribute values for a particular resource entity, the process or listener 113 can determine (e.g., using a lookup operation) the corresponding access type being used for access to the external service parameters. As an example, when a process of the internal computing environment 170 needs to retrieve a particular attribute value for a particular resource entity, it can determine through a lookup operation whether that particular attribute value is an attribute value to be "pulled". If so, the process can use a provider-defined API to retrieve a corresponding then-current external parameter from the external service. On the other hand, if a process of the internal computing environment 170 needs to retrieve a particular attribute value for a particular resource entity that the process determines (e.g., through the lookup operation), is an attribute value that is "pushed", then the process can depend on the fact that the most recent (e.g., then-current) external service parameter value had been "pushed" by an agent within the external service.

One embodiment of a system for implementing the external entity attribute management technique 200 and/or other herein disclosed techniques is disclosed as follows.

Figure 3:
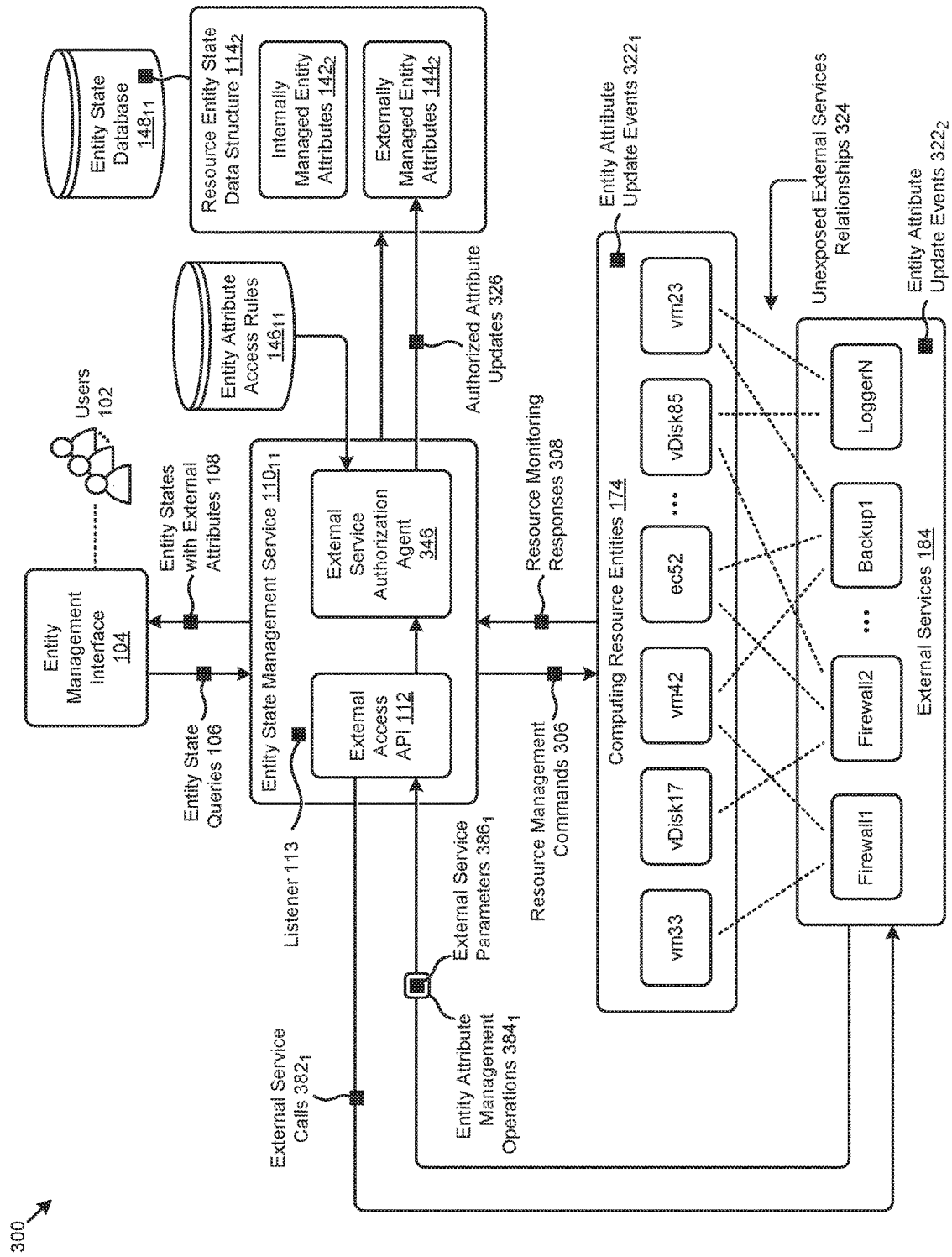
FIG. 3 presents a block diagram showing data flows as implemented in systems that facilitate management of computing resource attributes by external service providers, according to an embodiment.

FIG. 3 presents a block diagram showing data flows 300 as implemented in systems that facilitate management of computing resource attributes by external service providers. As an option, one or more variations of data flows 300 or any aspect thereof may be implemented in the context of the architecture and functionality of the embodiments described herein. The data flows 300 or any aspect thereof may be implemented in any environment.

The embodiment shown in FIG. 3 depicts merely one example of a computing system that supports management of computing resource attributes by external service providers according to the herein disclosed techniques. The components, data structures, and data flows shown in FIG. 3 present one partitioning and associated data manipulation approach. The specific example shown is purely exemplary, and other subsystems, data structures, and/or partitioning are reasonable.

Specifically, the system of FIG. 3 comprises external services 184 which can have unexposed external services relationships 324 with various instances of the computing resource entities 174 (e.g., virtual machine "vm33", virtual disk "vDisk17", virtual machine "vm42", executable container "ec52", ... , virtual disk "vDisk85", virtual machine "vm23", etc.). The unexposed external services relationships 324 (e.g., for security purposes) can present challenges pertaining to efficiently accessing the external attributes of the external services 184 associated with the computing resource entities 174.

The embodiment of the herein disclosed techniques as depicted in FIG. 3 addresses such challenges in part by implementing an external access API 112 and an external service authorization agent 346 in an entity state management service $110_{11}$. Entity attribute update events (e.g., entity attribute update events $322_1$, entity attribute update events $322_2$, etc.) detected at the external services 184 and/or the computing resource entities 174 invoke the entity attribute management operations $384_1$ that are issued from the external services to the external access API 112. The entity attribute update events can pertain to any entity operation that results in changes to one or more attributes of a resource entity such as an entity reconfiguration, entity migration, entity creation, and/or other entity operations. In some cases, the entity attribute management operations $384_1$ are codified in the form of one or more external service calls $382_1$ from the external access API 112 to the external services 184. The external service calls $382_1$ might correspond to resource management commands 306 (e.g., that invoke entity state updates, etc.) issued by entity state management service $110_{11}$ over the computing resource entities 174 and/or resource monitoring responses 308 (e.g., that indicate entity changes, etc.) received by the entity state management service $110_{11}$ from the computing resource entities 174.

As can be observed, the entity attribute management operations $384_1$ comprise one or more external service parameters $386_1$. For example, the external service parameters associated with an entity attribute management operation from "Firewall1" might comprise the firewall make, model, and version. The entity attribute management operations $384_1$ and the external service parameters $386_1$ are made available to the external service authorization agent 346 for further processing. Specifically, the external service authorization agent 346 might apply a set of entity attribute access rules $146_{11}$ to the entity attribute management operations $384_1$ and external service parameters $386_1$ to determine authorization permissions and/or to determine a set of updatable attributes (e.g., authorized attribute updates 326) to administer over a set of externally managed entity attributes $144_2$. As shown, the set of externally managed entity attributes $144_2$ is subsumed within resource entity state data structure $114_2$. Other partitionings are possible, some of which partitionings facilitate allow/deny access checks. For example, externally managed entity attributes $144_2$ might be stored in one storage area and the internally managed entity attributes $142_2$ are stored in a different storage area. Irrespective of a particular partitioning, whereas the entity attribute access rules $146_{11}$ might allow updates to the externally managed entity attributes $144_2$ by external resources, the entity attribute access rules $146_{11}$ might also prohibit access to the internally managed entity attributes $142_2$ of the resource entity state data structure $114_2$ by external services.

The techniques disclosed herein facilitate access to information pertaining to the then-current external services associated with a particular resource entity in the presence of unexposed external services relationships 324. Specifically, as facilitated by the herein disclosed techniques, a user can issue an entity state query 106 to an entity state management service $110_{11}$ from entity management interface 104, and receive information taken from the entity state database $148_{11}$. Such information is returned as query results that describe entity states with external attributes 108. More particularly, responsive to a received entity state query, information pertaining to the then-current external service is returned as query results corresponding to the received entity state query.

Different external services can use different modes of the access mechanism. Different external services might be better suited to operate in one mode than in another mode. Strictly as an example, certain external services might have slow-changing parameters, in which case it would be wasteful to perform frequent polling. In such a case, such external services might install an access agent that performs a "push" of changing data such that no polling is needed. In other cases, certain external services might have data or parameters that are only infrequently accessed, even though it might be that the underlying data or parameters change frequently. In such a case, the external services might function in a "pull" mode exclusively. In still other cases, some external services host data or parameters that are frequently changing and frequently accessed, as well as data or parameters that are only infrequently accessed. In such cases, the external services might function in a mode that concurrently supports both "push" operations as well as "pull" operations.

The foregoing discussions describe techniques for providing an access mechanism to external services (e.g., access mechanism setup operations $240_1$ of FIG. 2), which techniques are disclosed in further detail as follows.

Figure 4:
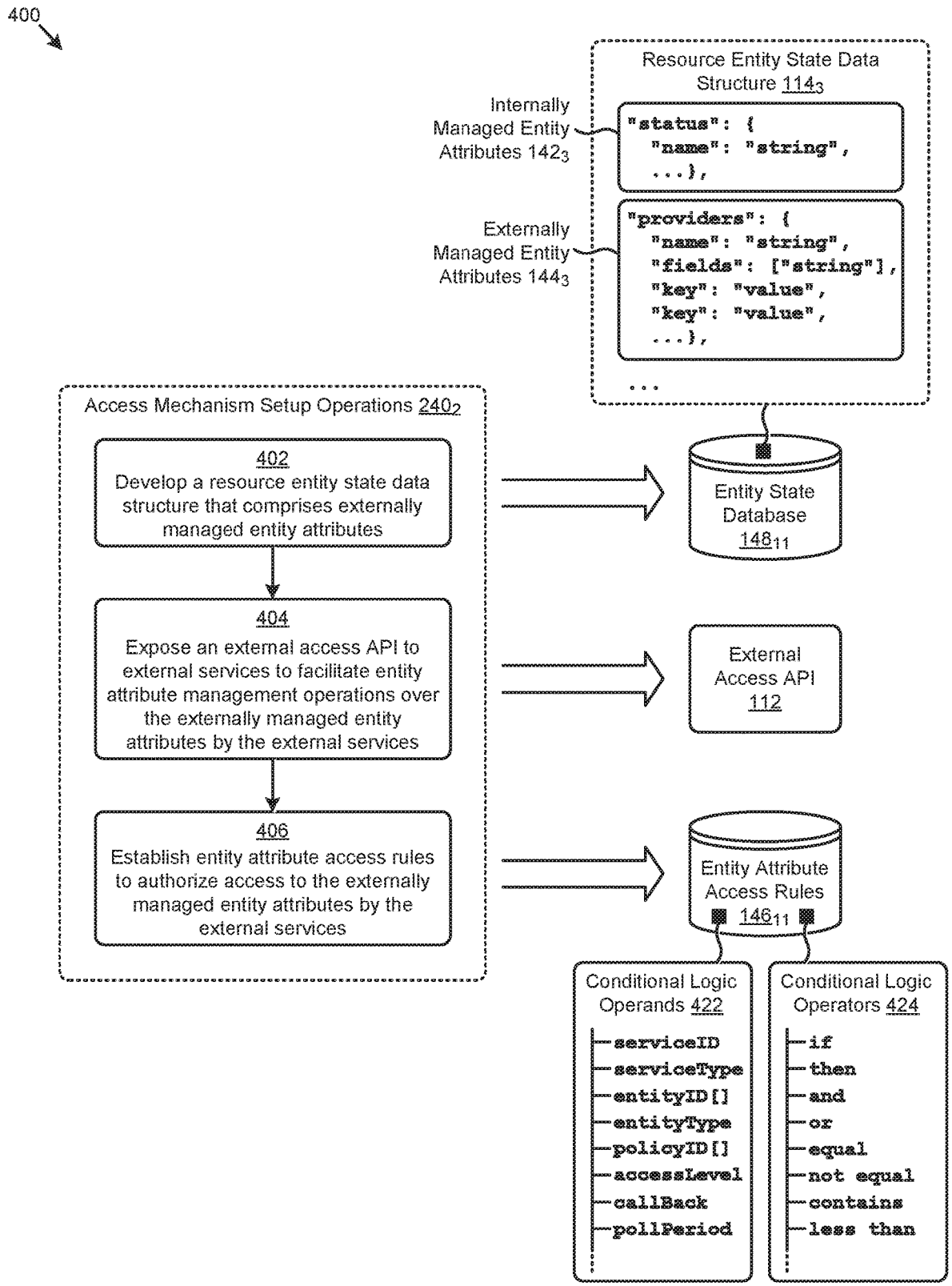
FIG. 4 presents an access mechanism implementation technique as implemented in systems that facilitate management of computing resource attributes by external service providers, according to an embodiment.

FIG. 4 presents an access mechanism implementation technique 400 as implemented in systems that facilitate management of computing resource attributes by external service providers. As an option, one or more variations of access mechanism implementation technique 400 or any aspect thereof may be implemented in the context of the architecture and functionality of the embodiments described herein. The access mechanism implementation technique 400 or any aspect thereof may be implemented in any environment.

The access mechanism implementation technique 400 presents one embodiment of certain steps and/or operations that establish an access mechanism to facilitate management of computing resource attributes by external service providers. Various illustrations are also presented to illustrate the access mechanism implementation technique 400. Further, specialized data structures designed to improve the way a computer stores and retrieves data in memory when performing steps and/or operations pertaining to access mechanism implementation technique 400 are also shown in FIG. 4.

In order for an external service to communicate specific data values for specific computing entities, a communication mechanism to support such a specific data value "push" needs to be established. Steps for setting up the communication mechanism often include agreement on the syntax and semantics of the specific data values. Setup often also includes coding or other integration techniques to facilitate making API calls. Still further, in many embodiments, rules might be established so as to facilitate the timing and other processing that occurs in the course of machine-to-machine communication. Strictly as one example, an external service provider might establish a "keep-alive" time, and keep track of the times when the computing system is in communication with the external service. If the "keep-alive" expires, the external service can raise an alert.

As shown, the access mechanism implementation technique 400 can represent an instance of access mechanism setup operations $240_2$ earlier described. The access mechanism implementation technique 400 can commence by developing a resource entity state data structure that comprises externally managed entity attributes (step 402). For example, a resource entity state data structure $114_3$ stored in an entity state database $148_{11}$ can comprise a set of internally managed entity attributes $142_3$ and a set of externally managed entity attributes $144_3$.

An external access API (e.g., external access API 112) is exposed to one or more external services to facilitate entity attribute management operations over the externally managed entity attributes by the external services (step 404). The access mechanism can be exposed in a document, or via any form of a description language (e.g., web services description language (WSDL)) to facilitate access to a service.

Particular embodiments of the herein disclosed techniques may provide an API (e.g., external access API 112) and/or a GUI for specifying how external providers can access entities and their corresponding properties (e.g., entity attributes). As depicted in resource entity state data structure $114_3$, a "providers" section lists a provider name entry (e.g., shown as "name"), into which entry the provider can enter its name (e.g., as a string). The scope of attributes listed in the providers section may be assumed to be handled by the provider. For example, a firewall provider can handle a particular scope, such as "spec.resources.secure", and mark that part of the specification (e.g., in the resource entity state data structure $114_3$) when it has secured the resource entity (e.g., VM).

In particular embodiments, a scope may comprise the path in a "spec" object that the provider acts on (e.g., "spec.policies.backup"), and "name" may comprise the name of the provider. In particular embodiments, the additional "fields" may comprise a list of fields within the scope that the provider acts upon (e.g., "retention_period", "rpo", etc.). In particular embodiments, "key":"value" may comprise key-value pairs (e.g., with value types of string, integer, Boolean, etc.) that are managed by the provider.

The access mechanism implementation technique 400 also comprises establishing one or more entity attribute access rules to authorize access to the externally managed entity attributes by the external services (step 406). Examples of rules and their use are now briefly discussed.

A set of rules (e.g., rule base) such as the entity attribute access rules described herein, comprise data records storing various information that can be used to form one or more constraints to apply to certain functions and/or operations. For example, and as illustrated, the entity attribute access rules $146_{11}$ can comprise conditional logic operands 422 (e.g., input variables, conditions, constraints, etc.) and/or conditional logic operators 424 (e.g., "if", "then", "and", "or", "equal", "not equal", "contains", "less than", etc.) for forming a conditional logic statement that returns one or more results. Examples of the conditional logic operands 422 that might comprise the entity attribute access rules $146_{11}$ pertain to an external service identifier (e.g., stored in a "service ID" variable), a service type (e.g., stored in a "serviceType" variable), one or more entity identifiers (e.g., stored in an "entityID[ ]" array), an entity type (e.g., stored in an "entityType" variable), one or more policy identifiers (e.g., stored in a "policyID[ ]" array), an access level (e.g., stored in an "accessLevel" variable), a call back URI (e.g., stored in a "callBack" variable), a polling period (e.g., stored in a "pollPeriod" variable), and/or other information.

The foregoing discussions describe techniques for synchronizing the then-current state of computing resource entities with their respective then-current associations with external services (e.g., synchronization operations $250_1$ of FIG. 2), which techniques are disclosed in further detail as follows.

Figure 5A:
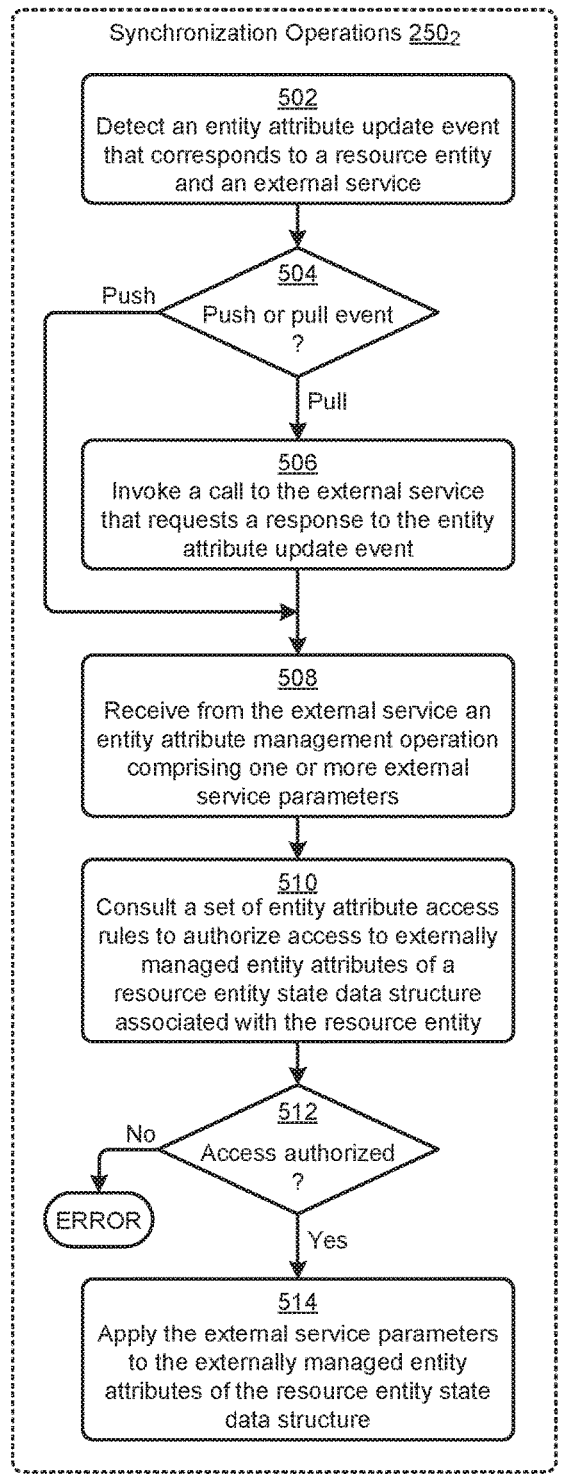
FIG. 5A depicts a block diagram showing an external service attribute synchronization technique as implemented in systems that facilitate management of computing resource attributes by external service providers, according to an embodiment.

FIG. 5A depicts a block diagram showing an external service attribute synchronization technique 5A00 as implemented in systems that facilitate management of computing resource attributes by external service providers. As an option, one or more variations of external service attribute synchronization technique 5A00 or any aspect thereof may be implemented in the context of the architecture and functionality of the embodiments described herein. The external service attribute synchronization technique 5A00 or any aspect thereof may be implemented in any environment.

The external service attribute synchronization technique 5A00 presents one embodiment of certain steps and/or operations that synchronize entity attributes of resource entities with external service parameters of the external services associated with the resource entities, according to the herein disclosed techniques. Various illustrations are also presented to illustrate the external service attribute synchronization technique 5A00.

As shown, the external service attribute synchronization technique 5A00 can represent an instance of synchronization operations $250_2$ earlier described. The external service attribute synchronization technique 5A00 can commence by detecting an entity attribute update event that corresponds to a resource entity and an external service (step 502). For example, an entity attribute update event $522_1$ associated with a resource entity (e.g., migrate VM, replicate VM, etc.) might be detected at entity state management service $110_{11}$. Further an entity attribute update event $522_2$ associated with an external service (e.g., connect firewall, perform backup, etc.) might be detected at one or more of the external services 184. If the event is a "pull" event (see "Pull" path of decision 504), a call is invoked to the external service to request a response to the entity attribute update event (step 506). As shown, entity state management services $110_{11}$ might issue such external service calls $382_2$ to the external services 184 through the external access API 112. If the event is a "push" event (see "Push" path of decision 504), or if the external service call has been issued (step 506), then an entity attribute management operation comprising one or more external service parameters is received from the external service (step 508). For example, the entity attribute management operations $384_2$ are shown to be issued from the external services 184 to the external access API 112.

A set of entity attribute access rules $146_{11}$ are consulted to authorize access to externally managed entity attributes of a resource entity state data structure associated with the resource entity (step 510). If access is not authorized (see "No" path of decision 512), an error is returned. If access is authorized (see "Yes" path of decision 512), the external service parameters are applied to the externally managed entity attributes of the resource entity state data structure (step 514). As illustrated in the embodiment of FIG. 5A, the entity state management service $110_{11}$ might access the entity attribute access rules $146_{11}$ to apply authorized attribute updates to a resource entity state data structure $114_4$.

A scenario that illustrates the external service attribute synchronization technique 5A00 and/or other techniques described herein is disclosed in detail as follows.

FIG. 5B1, FIG. 5B2, FIG. 5B3, FIG. 5B4, and FIG. 5B5 illustrate an external entity attribute management scenario 5B00 as implemented in systems that facilitate management of internal computing resource attributes by external service providers. As an option, one or more variations of external entity attribute management scenario 5B00 or any aspect thereof may be implemented in the context of the architecture and functionality of the embodiments described herein. The external entity attribute management scenario 5B00 or any aspect thereof may be implemented in any environment.

The external entity attribute management scenario 5B00 as shown in FIG. 5B1 depicts a virtual machine "vm42" having external services relationships $524_1$ with "Firewall2" and "Backup1". Various representative external service parameters 526 for the external services are shown. As can be observed, certain external service parameters (e.g., provider name "Fortinet", model "FortiGate", version "5.6.2", secured status "true") corresponds to the then-current firewall (e.g., "Firewall2") associated with "vm42" are represented in a set of select resource entity state data $532_1$. Further depicted in external entity attribute management scenario 5B00 are instances of entity state management service $110_{11}$, external access API 112, external service authorization agent 346, entity attribute access rules $146_{11}$, and entity state database $148_{11}$.

As shown in FIG. 5B2, an entity attribute update event $522_3$ corresponding to "vm42" might occur. For example, "vm42" might be migrated to a new site or cluster. The entity attribute update event $522_3$ results in a new set of external services relationships $524_2$ that include "Firewall1" and "Backup1" and no longer includes "Firewall2".

In response to detecting the entity attribute change event, "Firewall1" issues an entity attribute management command 584 to the external access API 112, as depicted in FIG. 5B3. As shown, the entity attribute management command 584 calls for an "update" operation pertaining to a certain set of external service parameters 3862 (e.g., provider name "cisco", model "ASA", version "9.1.6", secured status "true") that correspond to "Firewall1".

As indicated in FIG. 5B4, the external service authorization agent 346 at entity state management service $110_{11}$ applies one or more of the entity attribute access rules $146_{11}$ to the entity attribute management command forwarded by the external access API 112. As an example, the select entity attribute access rule 546 allows provider "cisco" to access (e.g., "edit") all attributes within its scope.

Figure 5A:
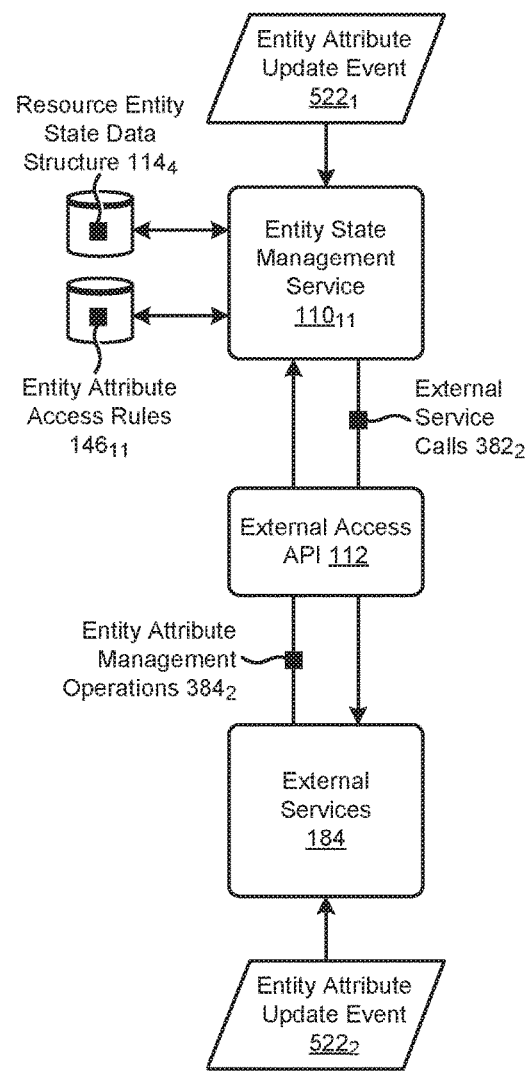

Referring to FIG. 5B5, the entity state management service $110_{11}$ then generates a new instance of the select resource entity state data 5322 with the external service parameters that had been "pushed" from "Firewall1".

The foregoing discussion describes the herein disclosed techniques as implemented in various computing systems and/or environments. One embodiment of a distributed virtualization environment in which the herein disclosed techniques can be implemented is disclosed in detail as follows.

Figure 6:
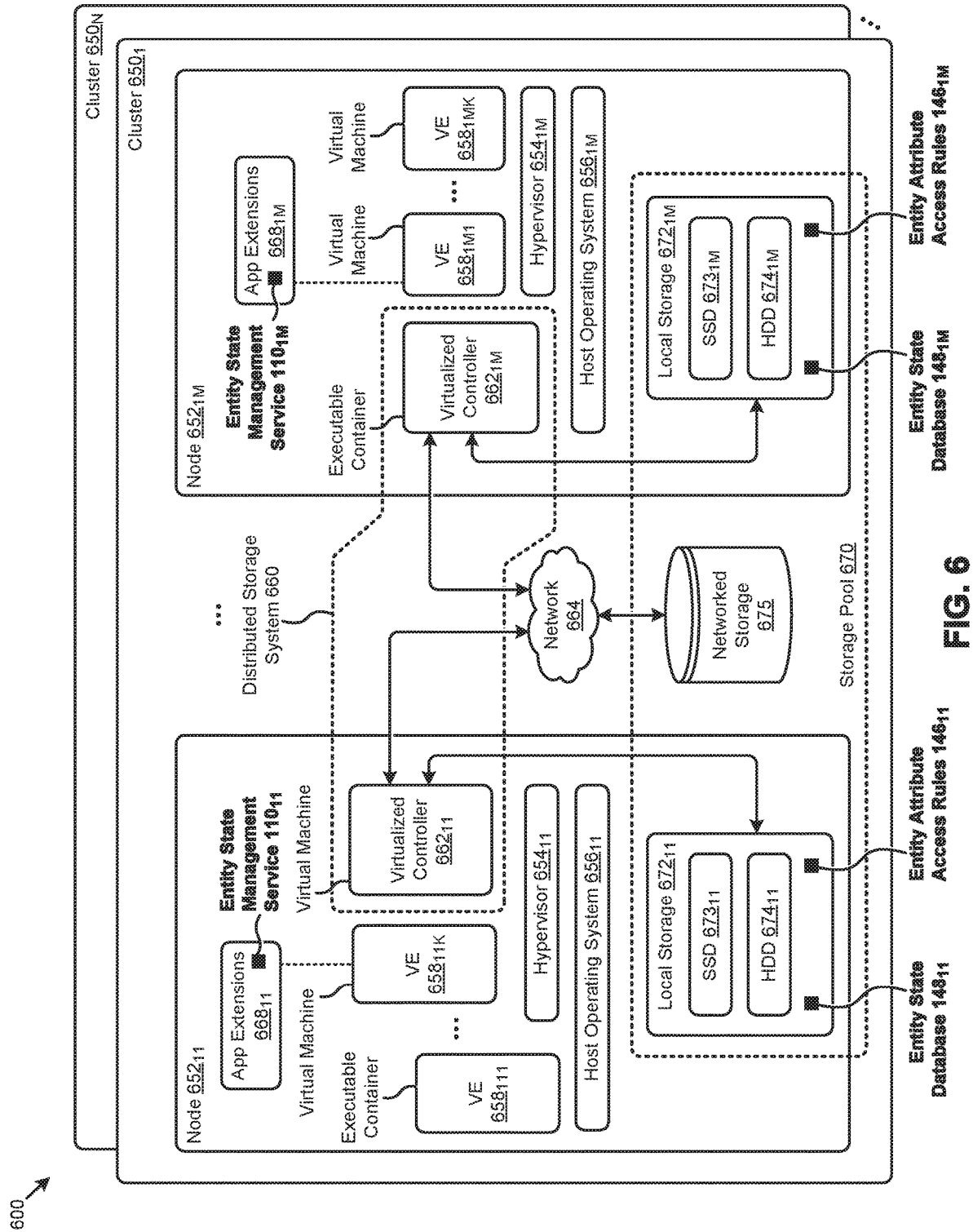
FIG. 6 presents a distributed virtualization environment in which embodiments of the present disclosure can be implemented.

FIG. 6 presents a distributed virtualization environment 600 in which embodiments of the present disclosure can be implemented. As an option, one or more variations of a distributed virtualization environment 600 or any aspect thereof may be implemented in the context of the architecture and functionality of the embodiments described herein. The distributed virtualization environment 600 or any aspect thereof may be implemented in any environment.

The shown distributed virtualization environment depicts various components associated with instances of distributed virtualization systems (e.g., hyperconverged distributed systems) that can be used to implement the herein disclosed techniques. Specifically, the distributed virtualization environment 600 comprises multiple clusters (e.g., cluster $650_1$, . . . , cluster $650_N$) comprising multiple nodes that have multiple tiers of storage in a storage pool. Representative nodes (e.g., node $652_{11}$, . . . , node $652_{1M}$) and storage pool 670 associated with cluster $650_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}$, . . . , local storage $672_{1M}$). For example, the local storage can be within or directly attached to a server and/or appliance associated with the nodes. Such local storage can include solid state drives (SSD $673_{11}$, . . . , SSD $673_{1M}$), hard disk drives (HDD $674_{11}$, . . . , HDD $674_{1M}$), and/or other storage devices.

As shown, any of the nodes of the distributed virtualization environment 600 can implement one or more user virtualized entities (e.g., VE $658_{111}$, . . . , VE $658_{11K}$, . . . , VE $658_{1M1}$, . . . , VE $658_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, . . . , host operating system $656_{1M}$), while the VMs run multiple applications on various respective guest operating systems. Such flexibility can be facilitated at least in part by a hypervisor (e.g., hypervisor $654_{11}$, . . . , hypervisor $654_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_{11}$, . . . , host operating system $656_{1M}$) without, in most cases, a hypervisor layer. This lightweight implementation can facilitate efficient distribution of certain software components, such as applications or services (e.g., micro-services). Any node of a distributed virtualization environment 600 can implement both a hypervisor-assisted virtualization environment and a container virtualization environment for various purposes. Also, any node in a distributed virtualization environment can implement a virtualized controller to facilitate access to storage pool 670 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 660 which can, among other operations, manage the storage pool 670. This architecture further facilitates efficient scaling in multiple dimensions (e.g., in a dimension of computing power, in a dimension of storage space, in a dimension of network bandwidth, etc.).

The foregoing virtualized controllers can be implemented in the distributed virtualization environment using various techniques. As one specific example, an instance of a virtual machine at a given node can be used as a virtualized controller in a hypervisor-assisted virtualization environment to manage storage and I/O (input/output or IO) activities. In this case, for example, the virtualized entities at node $652_{11}$ can interface with a controller virtual machine (e.g., virtualized controller $662_{11}$) through hypervisor $654_{11}$ to access the storage pool 670. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660. For example, a hypervisor at one node in the distributed storage system 660 might correspond to VMware ESXi software, and a hypervisor at another node in the distributed storage system 660 might correspond to Nutanix AHV software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $652_{1M}$ can access the storage pool 670 by interfacing with a controller container (e.g., virtualized controller $662_{1M}$) through hypervisor $654_{1M}$ and/or the kernel of host operating system $656_{1M}$.

In certain embodiments, one or more instances of an entity state management service can be implemented in the distributed virtualization environment 600 to facilitate the herein disclosed techniques. In certain embodiments, the entity state management service can be implemented as an application extension (e.g., app extension) managed by a virtualized entity (e.g., VM, executable container, etc.). More specifically, the entity state management service might be implemented as a containerized application extension managed by a virtualized container service machine. As shown in FIG. 6, entity state management service $110_{11}$ is implemented in a set of app extensions $668_{11}$ managed by VE $658_{11K}$ (e.g., a virtualized container service machine) in node $652_{11}$, and entity state management service $110_{1M}$ is implemented in a set of app extensions $668_{1M}$ managed by VE $658_{1M1}$ (e.g., a virtualized container service machine) in node $652_{1M}$.

In other embodiments, instances of the entity state management service are implemented in respective instances of the virtualized controller. Such instances of the virtualized controller, the entity state management service, the app extensions, and/or the virtualized service machines can be implemented in any node in any cluster. Actions taken by one or more instances of the entity state management service and/or virtualized controller can apply to a node (or between nodes), and/or to a cluster (or between clusters), and/or between any resources or subsystems accessible by the virtualized controller or their agents (e.g., entity state management service). Certain portions (e.g., external access API) of an access mechanism as described herein can be implemented in any instance of the entity state management service or in any component of the distributed virtualization environment 600 that is accessible by an external service. As further shown, the datastores associated with the herein disclosed techniques can be stored in various storage facilities in the storage pool 670. As an example, entity state database $148_{11}$ and entity attribute access rules $146_{11}$ might be stored at local storage $672_{11}$, and entity state database $148_{1M}$ and entity attribute access rules $146_{1M}$ might be stored at local storage $672_{1M}$.

As earlier described, the problems attendant to efficiently accessing the external attributes of external services associated with internal computing resources can be addressed in the context of the foregoing environment. Moreover, any aspect or aspects of exposing an access mechanism to a set of external services to authorize management of certain resource entity attributes by the external services can be implemented in in the context of the foregoing environment.

Additional Embodiments of the Disclosure

Additional Practical Application Examples

Figure 7A:
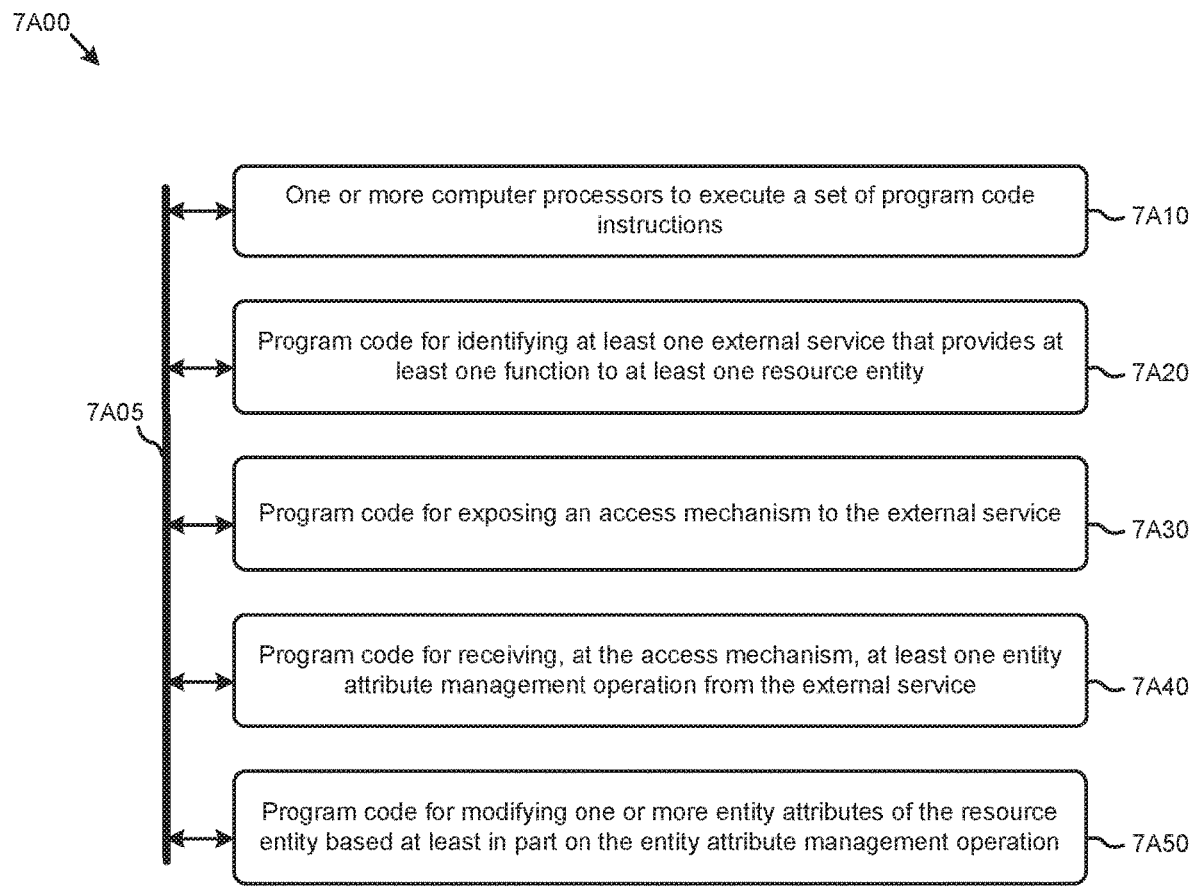
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently accessing the external attributes of external services associated with internal computing resources. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying at least one external service that provides at least one function to at least one resource entity (module 7A20); exposing an access mechanism to the external service (module 7A30); receiving, at the access mechanism, at least one entity attribute management operation from the external service (module 7A40); and modifying one or more entity attributes of the resource entity based at least in part on the entity attribute management operation (module 7A50).

Variations of the foregoing may include more or fewer of the shown modules. Certain variations may perform more or fewer (or different) steps, and/or certain variations may use data elements in more, or in fewer (or different) operations.

Still further, some embodiments include variations in the operations performed, and some embodiments include variations of aspects of the data elements used in the operations. Strictly as examples, such variations include embodiments where the access mechanism comprises at least one of, at least one external access API, one or more entity attribute access rules, or at least one resource entity state data structure; embodiments that further comprise applying one or more of the entity attribute access rules to the entity attribute management operation to determine an authorization; embodiments where the modifying of the external service is based at least in part on the authorization; embodiments where the entity attribute management operation is received at the external access API; embodiments where the external service interacts with the external access API; embodiments where at least one of the one or more entity attributes are codified in the resource entity state data structure; embodiments where the entity attribute management operation identifies one or more external service parameters; and embodiments where at least one of the entity attributes is modified based at least in part on at least one of the external service parameters. In some situations, the entity attribute management operation is delivered/received in response to a call to the external service. Furthermore, such delivery might be pre-registered by the external service to use the access mechanism. The aforementioned access mechanism might be initiated whenever there an entity attribute update event.

Figure 7B:
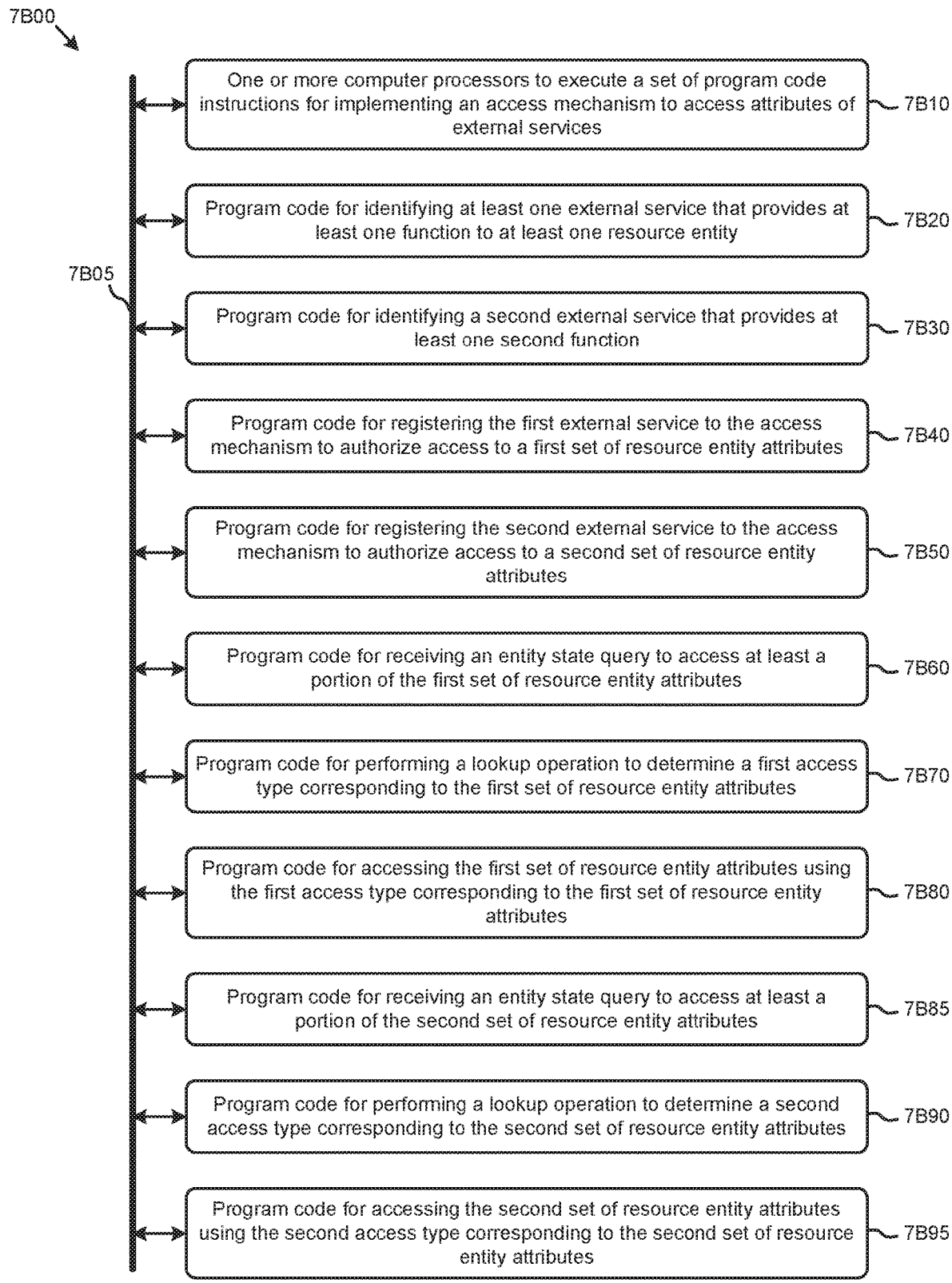

FIG. 7B depicts a system 7B00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently accessing the external attributes of external services associated with internal computing resources. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims. More specifically, when operating in an environment having a plurality of external services, synchronization between the external services and respective computing resource entities can happen in a sequential manner, or in a parallel manner, or in an interleaved manner where individual operations occur in an order such as (1) first operation involving a first external service followed by (2) a first operation involving a second external service, followed by (3) a second operation involving the first external service, and so on. Any of the foregoing manners of carrying out operations involving temporal coordination between two or more external services can be implemented in systems that have multi-tasking processors and/or multiple processors.

The shown system 7B00, comprises one or more computer processors to execute a set of program code instructions for implementing an access mechanism to access attributes of external services (module 7B10) and modules for accessing memory to hold program code instructions to perform: identifying a first external service that provides at least one first function to at least one computing resource entity (module 7B20); identifying a second external service that provides at least one second function (module 7B30); registering the first external service to the access mechanism to authorize access to a first set of resource entity attributes (module 7B40); registering the second external service to the access mechanism to authorize access to a second set of resource entity attributes (module 7B50); receiving an entity state query to access at least a portion of the first set of resource entity attributes (module 7B60); performing a first lookup operation to determine a first access type corresponding to the first set of resource entity attributes (module 7B70); accessing the first set of resource entity attributes using the first access type corresponding to the first set of resource entity attributes (module 7B80); receiving an entity state query to access at least a portion of the second set of resource entity attributes (module 7B85); performing a second d lookup operation to determine a second access type corresponding to the second set of resource entity attributes (module 7B90); and accessing the second set of resource entity attributes using the second access type corresponding to the second set of resource entity attributes (module 7B95).

System Architecture Overview

Additional System Architecture Examples

Figure 8A:
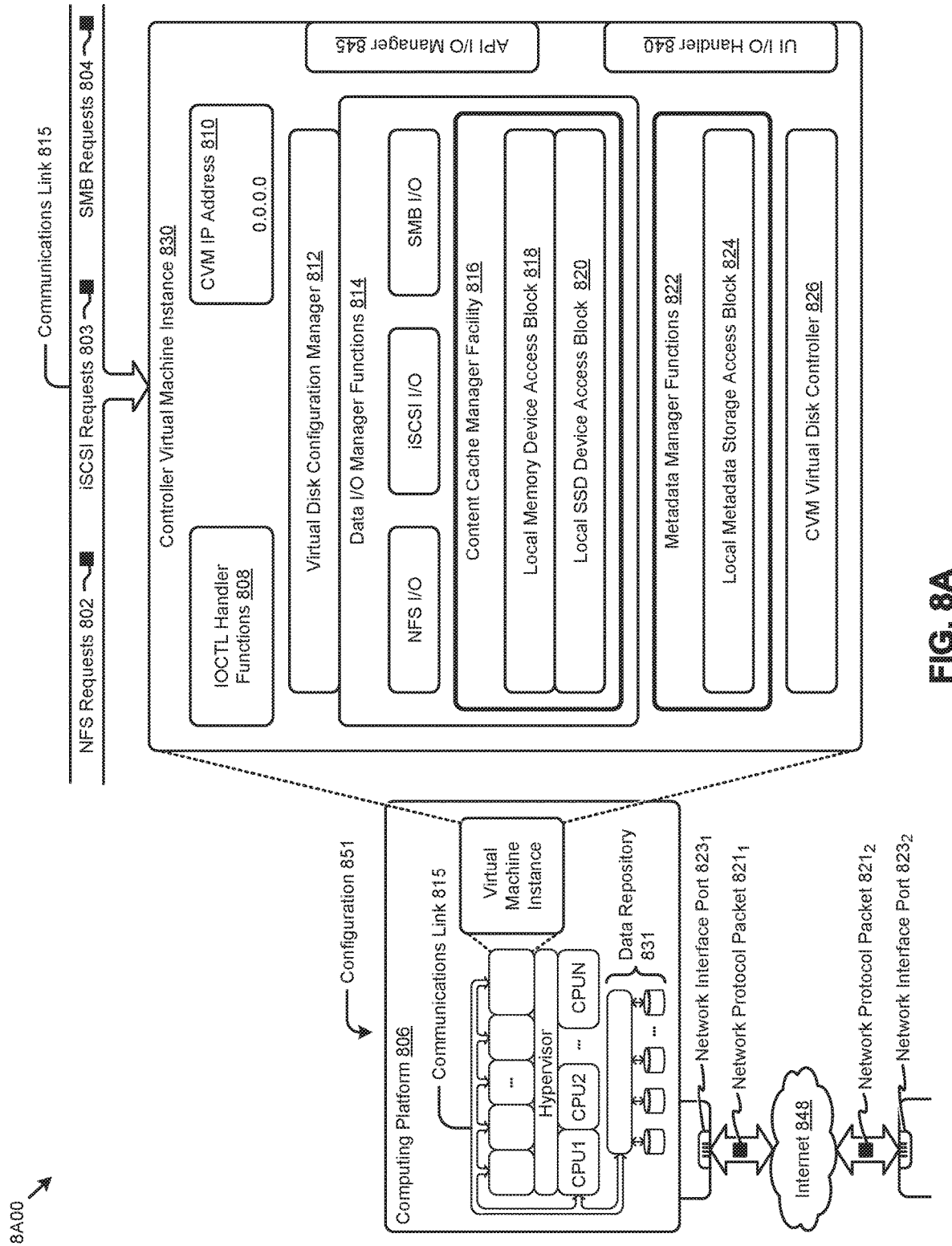
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of computing resource attributes by external service providers. In some embodiments, a module may include one or more state machines and/or combinational logic used to implement or facilitate the operational and/or performance characteristics pertaining to management of computing resource attributes by external service providers.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of management of computing resource attributes by external service providers). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to management of computing resource attributes by external service providers, and/or for improving the way data is manipulated during exchange and ongoing management of resource entity attributes.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
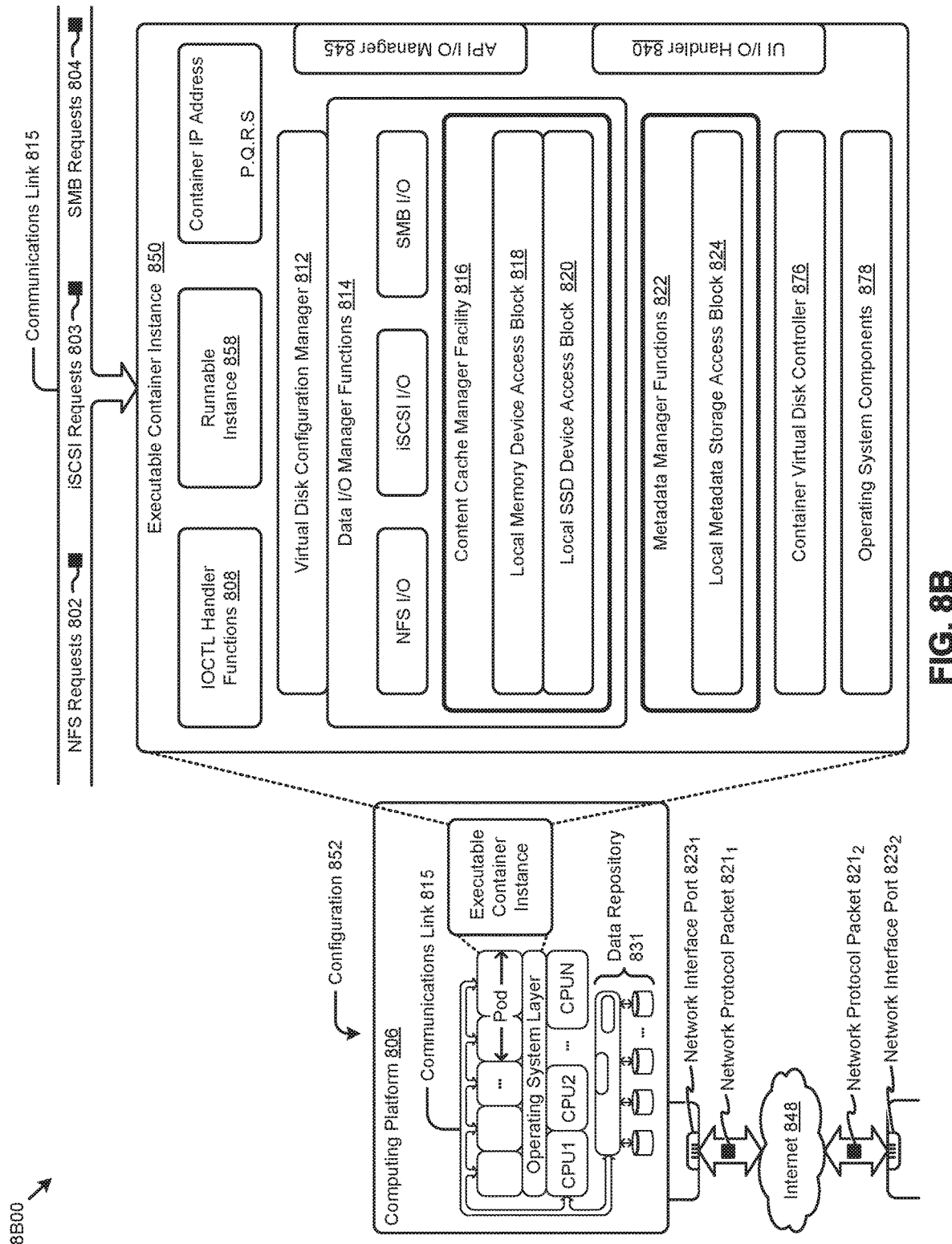

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
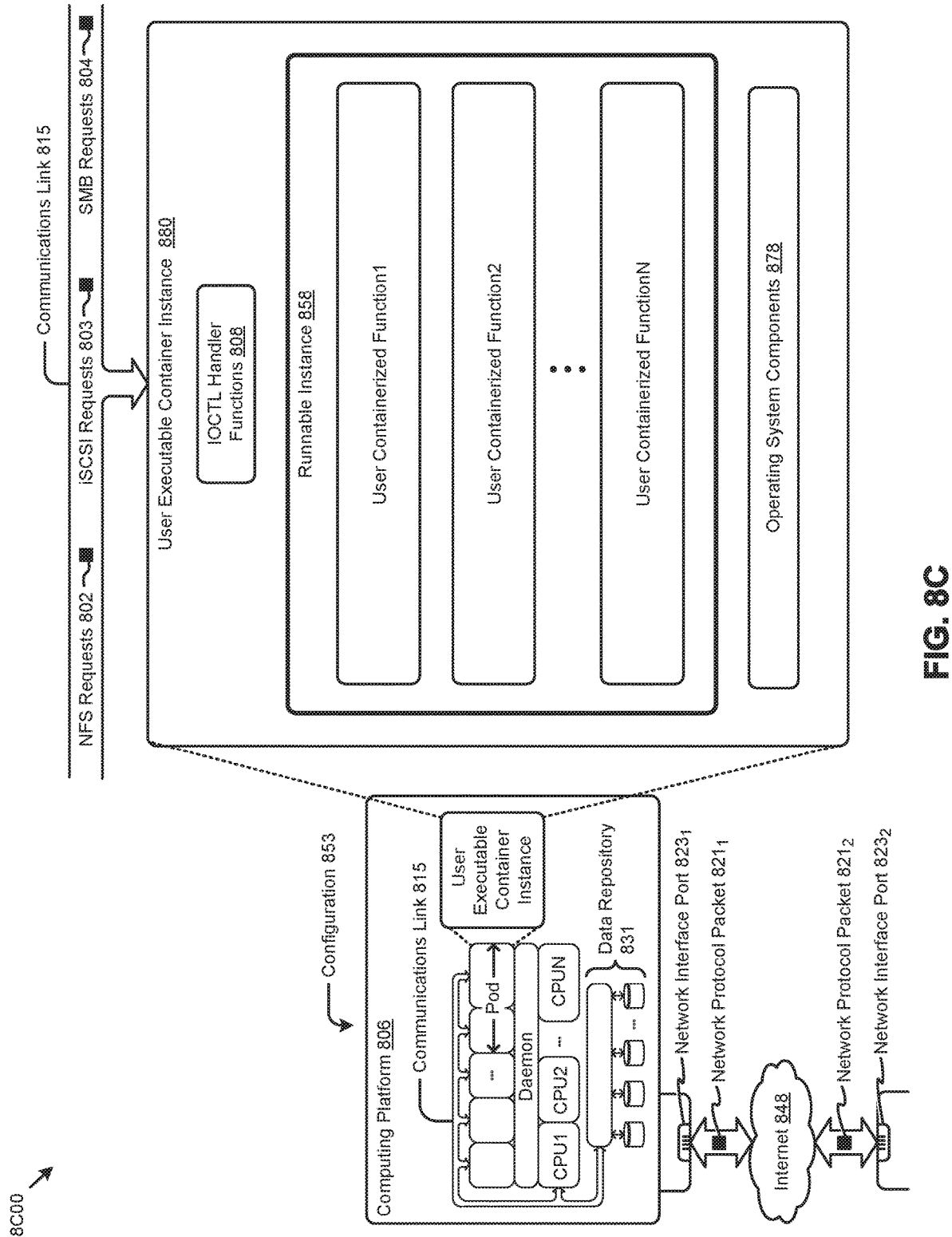

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerizedfunctionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    identifying a first external service, the first external service providing a first function to a computing resource entity;
    accessing a first set of resource entity attributes that perform the first function by:
        registering the first external service to an access mechanism to authorize access to a first set of resource entity attributes;
        receiving a first entity state query to access a portion of the first set of resource entity attributes;
        performing a first lookup operation to determine a first access type corresponding to the first set of resource entity attributes; and
        returning first query results corresponding to the first entity state query and the determined first access type, wherein the first access type provides access to external service parameters for a corresponding type of computing resource entity;
    accessing a second set of resource entity attributes that perform a second function by:
        registering a second external service to the access mechanism to authorize access to a second set of resource entity attributes;
        receiving a second entity state query to access a portion of the second set of resource entity attributes;
        performing a second lookup operation to determine a second access type corresponding to the second set of resource entity attributes; and
        returning second query results corresponding to the second entity state query and the determined second access type,
    wherein the first access type is different from the second access type, and wherein the second access type provides access to external service parameters, updating resource entity attributes based on external service parameters in response to an entity operation resulting in changes to one or more resource entity attributes, wherein the one or more updated resource entity attributes include a firmware update for a firewall.

2. The method of claim 1, wherein the access mechanism comprises at least one of a listener, an external access application programming interface (API), entity attribute access rules, or a resource entity state data structure.

3. The method of claim 2, further comprising applying the entity attribute access rules to an entity attribute management operation indication to determine an authorization.

4. The method of claim 3, further comprising performing an operation corresponding to the entity attribute management operation indication.

5. The method of claim 3, wherein the entity attribute management operation indication is received at the external access API.

6. The method of claim 3, wherein updating the first set of resource entity attributes based on the external service parameters pertains to a firmware version of an external service.

7. The method of claim 2, wherein the first external service interacts with the external access API.

8. The method of claim 2, wherein the entity attributes of the computing resource entity are codified in the resource entity state data structure.

9. The method of claim 1, wherein the first access type is a pull access type.

10. The method of claim 1, wherein the second access type is a push access type.

11. A non-transitory computer readable medium, embodied in a non-transitory computer readable medium, the non-transitory computer readable medium having stored thereon a sequence of instructions which, when stored in memory and executed by a processor causes the processor to perform a set of acts, the acts comprising:
    identifying a first external service, the first external service providing a first function to a computing resource entity;
    accessing a first set of resource entity attributes that perform the first function by:
        registering the first external service to an access mechanism to authorize access to a first set of resource entity attributes;
        receiving a first entity state query to access at least a portion of the first set of resource entity attributes;
        performing a first lookup operation to determine a first access type corresponding to the first set of resource entity attributes; and
        returning first query results corresponding to the first entity state query and the determined first access type, wherein the first access type provides access to external service parameters for a corresponding type of computing resource entity;
    accessing a second set of resource entity attributes that perform a second function by:
        registering a second external service to the access mechanism to authorize access to a second set of resource entity attributes;
        receiving a second entity state query to access at least a portion of the second set of resource entity attributes;

performing a second lookup operation to determine a second access type corresponding to the second set of resource entity attributes; and returning second query results corresponding to the second entity state query and the determined second access type, wherein the first access type is different from the second access type, and wherein the second access type provides access to external service parameters, updating resource entity attributes based on external service parameters in response to an entity operation resulting in changes to one or more resource entity attributes, wherein the one or more updated resource entity attributes include a firmware update for a firewall.

12. The non-transitory computer readable medium of claim 11, wherein the access mechanism comprises at least one of a listener, an external access application programming interface (API), entity attribute access rules, a resource entity state data structure.

13. The non-transitory computer readable medium of claim 12, further comprising instructions which, when stored in memory and executed by the processor causes the processor to perform acts of applying the entity attribute access rules to an entity attribute management operation indication to determine an authorization.

14. The non-transitory computer readable medium of claim 13, further comprising instructions which, when stored in memory and executed by the processor causes the processor to perform acts of performing an operation corresponding to the entity attribute management operation indication.

15. The non-transitory computer readable medium of claim 13, wherein the entity attribute management operation indication is received at the external access API.

16. The non-transitory computer readable medium of claim 13, wherein updating the first set of resource entity attributes based on the external service parameters pertains to a firmware version of an external service.

17. The non-transitory computer readable medium of claim 12, wherein the first external service interacts with the external access API.

18. The non-transitory computer readable medium of claim 12, wherein the entity attributes of the computing resource entity are codified in the resource entity state data structure.

19. The non-transitory computer readable medium of claim 11, wherein the first access type is a pull access type and the second access type is a push access type.

20. A system comprising:
a non-transitory computer readable storage medium having stored thereon a sequence of instructions; and
a processor that executes the instructions to cause the processor to perform a set of acts, the acts comprising,
identifying a first external service and a second external service, the first external service providing a first function to a computing resource entity, and the second external service providing a second function to computing resource entity;
accessing a first set of resource entity attributes that perform the first function by:
registering the first external service to an access mechanism to authorize access to a first set of resource entity attributes;
receiving a first entity state query to access a portion of the first set of resource entity attributes;
performing a first lookup operation to determine a first access type corresponding to the first set of resource entity attributes; and
returning first query results corresponding to the first entity state query and the determined first access type;
accessing a second set of resource entity attributes that perform the second function by:
registering the second external service to the access mechanism to authorize access to a second set of resource entity attributes;
receiving a second entity state query to access a portion of the second set of resource entity attributes;
performing a second lookup operation to determine a second access type corresponding to the second set of resource entity attributes;
returning second query results corresponding to the second entity state query and the determined second access type; and
updating the second set of resource entity attributes based on external service parameters;
wherein the first access type is different from the second access type, and wherein the first access type and the second access type provide access to external service parameters for a corresponding type of computing resource entity,
updating resource entity attributes based on external service parameters in response to an entity operation resulting in changes to one or more resource entity attributes, wherein the one or more updated resource entity attributes include a firmware update for a firewall.

21. The system of claim 20, wherein the first access type is a pull access type and the second access type is a push access type.

* * * * *